United States Patent [19]
Tabata et al.

[11] Patent Number: 5,923,093
[45] Date of Patent: Jul. 13, 1999

[54] HYBRID VEHICLE DRIVE SYSTEM ADAPTED TO ASSURE SMOOTH BRAKE APPLICATION BY MOTOR/GENERATOR OR ENGINE

[75] Inventors: Atsushi Tabata, Okazaki; Yutaka Taga, Aichi-ken; Ryuji Ibaraki, Toyota; Hiroshi Hata, Toyota; Tsuyoshi Mikami, Toyota, all of Japan

[73] Assignee: Toyota Jidosha Kabushiki Kaisha, Toyota, Japan

[21] Appl. No.: 08/885,853

[22] Filed: Jun. 30, 1997

[30] Foreign Application Priority Data

| Jul. 2, 1996 | [JP] | Japan | 8-171988 |
| Jul. 3, 1996 | [JP] | Japan | 8-173455 |
| Sep. 18, 1996 | [JP] | Japan | 8-246205 |

[51] Int. Cl.$^6$ .................................................. H02P 9/04
[52] U.S. Cl. ........................ 290/40 C; 290/9; 290/45; 322/40
[58] Field of Search ................. 290/1 C, 8, 9, 290/40 R, 40 A, 40 C, 45, 51; 322/16, 40; 318/139; 180/248

[56] References Cited

U.S. PATENT DOCUMENTS

| 5,558,588 | 9/1996 | Schmidt | 475/5 |
| 5,571,058 | 11/1996 | Schmidt | 475/5 |
| 5,698,905 | 12/1997 | Ruthlein et al. | 290/32 |
| 5,735,770 | 4/1998 | Omote et al. | 477/5 |
| 5,847,469 | 12/1998 | Tabata et al. | 290/40 C |
| 5,856,709 | 1/1999 | Ibaraki et al. | 290/45 |

FOREIGN PATENT DOCUMENTS

| A-7-67208 | 3/1995 | Japan . |
| A-7-294148 | 11/1995 | Japan . |

Primary Examiner—Thomas M. Dougherty
Assistant Examiner—Nicholas Ponomarenko
Attorney, Agent, or Firm—Oliff & Berridge, PLC

[57] ABSTRACT

A hybrid drive system for a motor vehicle, including an engine, a motor/motor, an automatic transmission disposed between the engine and a vehicle drive wheel, a regenerative braking device for applying to the vehicle a regenerative braking force corresponding to an amount of electric energy generated by the motor/generator during an operation of the motor/generator by a kinetic energy of the running vehicle, and at least one of (a) a shift inhibiting device for inhibiting a shifting action of the automatic transmission during an operation of the regenerative braking device so as to prevent a change of an engine braking force applied to the vehicle, (b) a braking shift control device which is operated when the regenerative braking device is inoperable to provide the required regenerative braking force, for changing the speed ratio of the automatic transmission to increase the engine braking force, or operated prior to the operation of the regenerative braking device, for controlling the speed ratio of the transmission so as to apply the engine brake to the vehicle, and (c) a mode change inhibiting device for inhibiting a change of operation mode between regenerative braking mode and engine braking mode during regenerative braking or engine braking.

24 Claims, 23 Drawing Sheets

FIG. 3

| SHIFT LEVER | TRANSMISSION | CLUTCHES | | BRAKES | | | | | ONE-WAY CLUTCHES | | | SPEED RATIO |
|---|---|---|---|---|---|---|---|---|---|---|---|---|
| | | $C_0$ | $C_1$ | $C_2$ | $B_0$ | $B_1$ | $B_2$ | $B_3$ | $B_4$ | $F_0$ | $F_1$ | $F_2$ | |
| NEUTRAL | N | ○ | | | | | | | | | | | — |
| REVERSE | Rev | ○ | | ○ | | | | | | | | | −4.550 |
| DRIVE | 1st | ○ | ○ | | | | | | ○ | ○ | | | 3.357 |
| | 2nd | ● | ○ | | | | | | ● | ○ | | ○ | 2.180 |
| | 3rd | ○ | ○ | | | ● | | ○ | | ○ | ○ | | 1.424 |
| | 4th | ○ | ○ | ○ | | | ○ | | | ○ | | | 1.000 |
| | 5th | | ○ | ○ | ○ | | ○ | | | | | | 0.753 |

Note: Column alignment for CLUTCHES is $C_0$, $C_1$, $C_2$ and for BRAKES is $B_0$, $B_1$, $B_2$, $B_3$, $B_4$.

FIG. 8

| MODE | CLUTCHES | | ENGINE 12 | STORAGE DEVICE 58 | MODE NOMENCLATURE |
|---|---|---|---|---|---|
| | CE1 | CE2 | | | |
| 1 | OFF | ON | OFF | DISCHARGED | MOTOR DRIVE |
| 2 | ON | ON | ON | NO ENG. CSMD | ENGINE DRIVE |
| 3 | ON | ON | ON | CHARGED | ENGINE DRIVE + CHARGING |
| 4 | ON | ON | ON | DISCHARGED | ENGINE · MOTOR DRIVE |
| 5 | ON | OFF | ON | CHARGED | VEHICLE START BY ENGINE |
| 6 | OFF | ON | OFF | CHARGED | REGENERATIVE BRAKING |
| 7 | ON | OFF | ON | NO ENG. CSMD | ELECTRIC NEUTRALITY |
| 8 | ON | ON | OFF | NO ENG. CSMD | ENGINE BRAKING |
| 9 | ON | ON | START | DISCHARGED | ENGINE STARTING |

FIG. 15
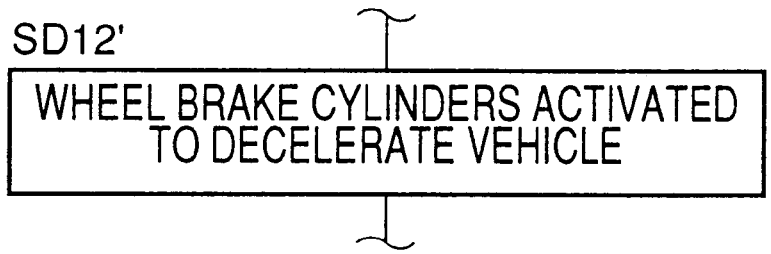
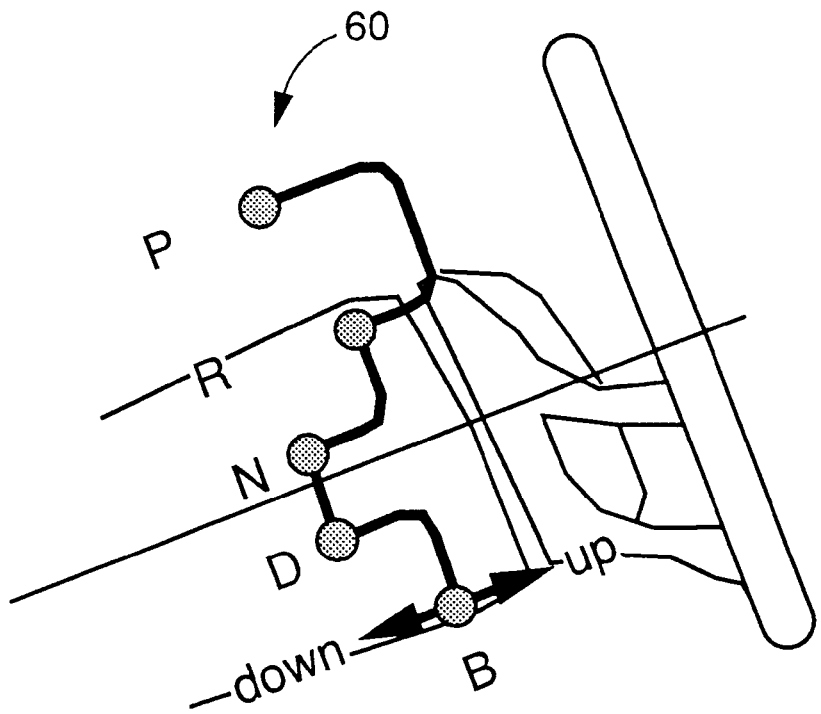
FIG. 16

FIG. 24

| SHIFT LEVER | TRANSMISSION | CLUTCHES | | BRAKES | | | | ONE-WAY CLUTCHES | | SPEED RATIO |
|---|---|---|---|---|---|---|---|---|---|---|
| | | $C_1$ | $C_2$ | $B_1$ | $B_2$ | $B_3$ | $B_4$ | $F_1$ | $F_2$ | |
| NEUTRAL | N | | | | | | | | | — |
| REVERSE | Rev | | ○ | | | | ○ | | | -4.550 |
| DRIVE | 1st | ○ | | | | | ● | | ○ | 3.357 |
| | 2nd | ○ | | | | ○ | | | | 2.180 |
| | 3rd | ○ | | ● | ○ | | | ○ | | 1.424 |
| | 4th | ○ | ○ | | ○ | | | | | 1.000 |

HYBRID VEHICLE DRIVE SYSTEM ADAPTED TO ASSURE SMOOTH BRAKE APPLICATION BY MOTOR/GENERATOR OR ENGINE

This application is based on Japanese Patent Applications Nos. 8-171988, 8-173455 and 8-246205 filed Jul. 2, Jul. 3 and Sep. 18, 1996, respectively, the contents of which are incorporated hereinto by reference.

BACKGROUND OF THE INVENTION

1. Field of the Invention

The present invention relates in general to a hybrid drive system for a motor vehicle, and more particularly to techniques for smooth brake application by a motor/generator or an engine.

2. Discussion of the Related Art

JP-A-7-67208 discloses an example of a known hybrid drive system of a motor vehicle, which is equipped with a drive power source including an engine operated by combustion of a fuel, and an electric motor operated with an electric energy, and an automatic transmission which is disposed between the drive power source and drive wheels of the vehicle and whose speed ratio is variable. This type of hybrid drive system has a regenerative braking mode in which the motor/generator is operated by a kinetic energy of the running motor vehicle, to apply to the vehicle a regenerative braking force corresponding to an amount of electric power generated by the motor/generator. The braking force to be applied to the vehicle can be smoothly changed by controlling the amount of electric power or the amount of regenerative braking torque generated by the motor/generator.

When the automatic transmission is shifted from one position to another in the regenerative braking mode, a braking force generated by a resistance to rotation of the engine operatively connected to the automatic transmission tends to vary to a considerable extent, causing a change in the overall braking force applied to the vehicle, unexpectedly to the operator of the vehicle. When the vehicle is running with the motor/generator being connected to the automatic transmission, the regenerative braking force itself of the motor/generator varies upon a shifting action of the automatic transmission.

In some running condition of the vehicle, the regenerative braking force generated by the motor/generator is not sufficient for braking the vehicle as desired. In the event of some electrical abnormality of the hybrid drive system, the motor/generator may not be used to apply a regenerative braking to the vehicle. In such cases, the regenerative braking cannot be applied to the vehicle as desired by the vehicle operator.

Japanese Patent Application No. 7-294148 (not published before the present invention was made) discloses a hybrid drive system having a plurality of operation modes which include the regenerative braking mode described above, and an engine braking mode in which the engine is operated by a kinetic energy of the running vehicle, to apply an engine brake to the vehicle due to a resistance to rotation of the engine. The regenerative braking and the engine braking are collectively referred to as "drive-source braking", and the sum of the regenerative braking force and the engine braking force is referred to as "drive-source braking force".

In the above type of hybrid drive system, the regenerative braking mode and the engine braking mode are selectively established depending upon the amount of electric energy stored in an electric energy storage device, in order to prevent excessive charging of the storage device and resulting deterioration of the charging and discharging efficiencies of the storage device. Described in detail, the regenerative braking mode is established to charge the electric energy storage device when the amount of electric energy stored is smaller than a predetermined threshold level below which the storage device is not excessively charged by the regenerative braking. When the amount of electric energy stored in the storage device is larger than the threshold level, the engine braking mode is established to prevent excessive charging of the storage device.

In the hybrid drive system wherein the generative braking mode and the engine braking mode are selectively established on the basis of the amount of electric energy stored in the electric energy storage device, the operation mode of the hybrid drive system may be changed from one of the regenerative and engine braking modes to the other if the amount of the stored electric energy is considerably changed in the above-indicated one braking mode. Namely, the braking source (drive power source) used for braking the vehicle may be changed during the drive-source braking operation. In this event, clutches or other members provided for switching the braking source are operated during the braking operation, whereby the drive-source braking force tends to vary, unexpectedly to the vehicle operator. A similar problem is encountered where the generative and engine braking modes are selected on the basis of a required braking force or other vehicle running condition other than the amount of electric energy stored in the electric energy storage device.

SUMMARY OF THE INVENTION

It is therefore a first object of the present invention to provide a hybrid drive system for a motor vehicle, which includes an engine and a motor/generator as a drive power source and an automatic transmission between the engine and the vehicle drive wheels, and which is adapted to prevent an unexpected change of a drive-source braking force applied to the vehicle during regenerative braking by the motor/generator or assure smooth application of the braking force to the vehicle as needed.

It is a second object of the present invention to provide a hybrid drive system for a motor vehicle, which has regenerative braking means for applying a regenerative braking force to the vehicle and engine braking means for applying an engine braking force to the vehicle, and which is adapted to prevent an unexpected change of a drive-source braking force during operation of the regenerative or engine braking means unexpectedly to the vehicle operator.

The first object may be achieved according to a first aspect of this invention, which provides a hybrid drive system for a motor vehicle, comprising: (a) a drive power source including an engine operated by combustion of a fuel, and a motor/generator operated with an electric energy; (b) an automatic transmission which is disposed between at least the engine of the drive power source and a drive wheel of the motor vehicle and which is shifted to change a speed ratio thereof in steps according to predetermined shift patterns; (c) regenerative braking means for applying to the motor vehicle a regenerative braking force corresponding to an amount of electric energy generated by the motor/generator during operation of the motor/generator by a kinetic energy of the motor vehicle; and (d) shift inhibiting means for inhibiting a shifting action of the automatic transmission during operation of the regenerative braking means, so as to prevent a change of an engine braking force which is applied to the motor vehicle due to a resistance to rotation of the engine.

In the hybrid drive system constructed as described above according to the first aspect of this invention, the shift inhibiting means is adapted to inhibit the automatic transmission from being shifted up or down during operation of the regenerative braking means, so that the engine braking force generated by the engine connected to the automatic transmission is held constant. Thus, the present hybrid drive system does not suffer from a sudden change in the braking force which would occur during the regenerative braking operation due to a shifting action of the automatic transmission, unexpectedly to the vehicle operator. Where the motor/generator is connected to the automatic transmission, the shift inhibiting means is also effective to prevent a change in the regenerative braking force due to a shifting action of the automatic transmission.

The first object indicated above may also be achieved according to a second aspect of this invention, which provides a hybrid drive system for a motor vehicle, comprising: (a) a drive power source including an engine operated by combustion of a fuel, and a motor/generator operated with an electric energy; (b) an automatic transmission which is disposed between at least the engine of the drive power source and a drive wheel of the motor vehicle and whose speed ratio is variable; (c) regenerative braking means for applying to the motor vehicle a regenerative braking force corresponding to an amount of electric energy generated by the motor/generator during operation of the motor/generator by a kinetic energy of the motor vehicle; and (d) braking shift control means operated when the regenerative braking means is inoperable to provide a required amount of the regenerative braking force, for changing the speed ratio of the automatic transmission to increase an engine braking force which is generated by a resistance to rotation of the engine and which is applied to the motor vehicle.

In the hybrid drive system constructed as described above according to the second aspect of this invention, the braking shift control means is operated when the regenerative braking means is inoperable to provide the required regenerative braking force. The braking shift control means is adapted to change the speed ratio of the automatic transmission to increase the speed of the engine and to increase the engine braking force by a torque boosting effect of the automatic transmission. The present arrangement permits the application of a sufficient overall braking force owing to the increase of the increased engine braking force, even when the regenerative braking force generated by the motor/generator is insufficient or even when the regenerative braking means cannot be operated due to electrical or other abnormality thereof. Where the motor/generator is connected to the automatic transmission, the operation of the braking shift control means permits the regenerative braking force itself to increase with a change in the speed ratio of the automatic transmission, even when the generated regenerative braking force has reached the maximum value of the motor/generator.

The regenerative braking means is inoperable when the motor/generator itself fails to normally function, when the electrical system connected to the motor/generator is defective, or when the amount of electric energy stored in an electric energy storage device exceeds a predetermined upper limit so that the operation of the motor/generator may cause excessive charging of the storage device. The regenerative braking means is inoperable to provide the required regenerative braking force when the regenerative braking torque generated by the motor/generator has reached the maximum value, namely, when the maximum regenerative braking torque of the motor/generator is insufficient or smaller than required by the vehicle operator.

In one preferred form of this second aspect of the invention, the hybrid drive system further comprises the shift inhibiting means according to the first aspect of the invention, for inhibiting a shifting action of the automatic transmission during operation of the regenerative braking means, so as to prevent a change of an engine braking force which is applied to the motor vehicle due to a resistance to rotation of the engine.

The first object indicated above may also be achieved according to a third aspect of this invention, which provides a hybrid drive system of a motor vehicle, comprising: (a) a drive power source including an engine operated by combustion of a fuel, and a motor/generator operated with an electric energy; (b) an automatic transmission which is disposed between at least the engine of the drive power source and a drive wheel of the motor vehicle and whose speed ratio is variable; (c) regenerative braking means for applying to the motor vehicle a regenerative braking force corresponding to an amount of electric energy generated by the motor/generator during an operation of the motor/generator by a kinetic energy of the motor vehicle; and (d) braking shift control means operated prior to an operation of the regenerative braking means, for controlling the speed ratio of the automatic transmission, so that an engine braking force generated by a resistance to rotation of the engine is applied to the motor vehicle.

In the hybrid drive system constructed as described above according to the third aspect of this invention, the braking shift control means is operated prior to an operation of the regenerative braking means, for controlling the speed ratio of the automatic transmission so as to apply an engine braking force to the vehicle. This arrangement permits the application of a sufficient drive-source braking force to the vehicle owing to the application of the engine braking force to the vehicle, even when the regenerative braking force generated by the regenerative braking means is not sufficient.

The first object indicated above may also be achieved according to a fourth aspect of this invention, which provides a hybrid drive system of a motor vehicle, comprising: (a) a drive power source including an engine operated by combustion of a fuel, and a motor/generator operated with an electric energy; (b) an automatic transmission which is disposed between at least the engine of the drive power source and a drive wheel of the motor vehicle and whose speed ratio is variable; (c) clutch means disposed between the automatic transmission and the engine, for selectively connecting and disconnecting the automatic transmission and the engine to and from each other; (d) regenerative braking means for applying to the motor vehicle a regenerative braking force corresponding to an amount of electric energy generated by the motor/generator during operation of the motor/generator by a kinetic energy of the motor vehicle; and (e) clutch engaging means for engaging the clutch means to connect the automatic transmission and the engine to each other during operation of the regenerative braking means.

In the hybrid drive system constructed as described above according to the fourth aspect of this invention, the clutch engaging means is adapted to engage the clutch means for connecting the engine and the automatic transmission to each other when the regenerative braking force is applied to the vehicle by the regenerative braking means. This arrangement makes it possible to apply a suitable engine braking force to the vehicle by shifting down the automatic transmission, even if the regenerative braking means becomes inoperative during its operation and fails to provide the required regenerative braking force, due to electric abnormality thereof, for example.

The second object indicated above may be achieved according to a fifth aspect of this invention, which provides a hybrid drive system for a motor vehicle, comprising: (a) a drive power source including an engine operated by combustion of a fuel, and a motor/generator; (b) regenerative braking means operated in a regenerative braking mode, for applying to the motor vehicle a regenerative braking force corresponding to an amount of electric energy generated by the motor/generator during an operation of the motor/generator by a kinetic energy of the motor vehicle; (c) engine braking means operated in an engine braking mode, for applying to the motor vehicle an engine braking force corresponding to a resistance to rotation of the engine when the engine is operated by the kinetic energy of the motor vehicle; (d) the regenerative braking mode and the engine braking mode being selectively established under respective running conditions of the motor vehicle; and (e) mode change inhibiting means for inhibiting a change between the regenerative braking mode and the engine braking mode while one of the regenerative braking means and the engine braking means is operated.

In the hybrid drive system constructed as described above according to the fifth aspect of this invention, the mode change inhibiting means inhibits a change from the regenerative braking mode to the engine braking mode when the regenerative braking means is operated in the regenerative braking mode, and a change from the engine braking mode to the regenerative braking mode when the engine braking means is operated in the engine braking mode. Thus, the mode change inhibiting means inhibits a change of the source of the drive-source braking from the motor/generator to the engine or vice versa during the operation of the regenerative braking means or the engine braking means, and further inhibits a switching operation of a clutch used to selectively establish the regenerative braking mode and the engine braking mode. The inhibition of the mode change and the change of the operating state of the clutch in the regenerative or engine braking mode assures a change of the drive-source braking force unexpected to the vehicle operator.

In one preferred form of the fifth aspect of this invention, the hybrid drive system further comprises an automatic transmission which is disposed between the drive power source and a drive wheel of the motor vehicle and whose speed ratio is variable, and the engine braking means comprises means operated in the engine braking mode, for changing the speed ratio of the automatic transmission to apply the engine braking force to the motor vehicle. In this case, the regenerative braking means comprises means operated in the regenerative braking mode, for controlling the electric energy generated by the motor/generator so that the regenerative braking force is substantially equal to the engine braking force generated by changing the speed ratio. This arrangement does not cause a difference between the regenerative braking force generated in the regenerative braking mode and the engine braking force generated in the engine braking mode.

Where the automatic transmission is a continuously variable transmission, the engine braking force generated by the engine braking means linearly varies as the speed ratio of the continuous variation transmission continuously varies. In this case, the regenerative braking force generated by the regenerative braking means is desirably controlled to linearly vary like the engine braking force.

Where the automatic transmission has two or more positions having respective different speed ratios, it is desirable to control the amount of slip of a lock-up clutch (disposed between the engine and the vehicle drive wheels) for controlling the engine braking force, with the speed ratio of the transmission taken into account, so that the engine braking force varies at a rate similar to that of the regenerative braking force. The opening angle of the throttle valve may be controlled in place of the amount of slip of the lock-up clutch, so that the engine braking force varies like the regenerative braking force.

The hybrid drive system of the present invention may be adapted such that different operation modes are selectively established by selective engagement and disengagement of clutches for selective connection and disconnection of the engine and the motor/generator to and from the automatic transmission, or by a synthesizing and distributing mechanism such as a planetary gear mechanism adapted to synthesize and distribute the outputs of the engine and the motor/generator. Alternatively, the hybrid drive system may be arranged such that one of the engine and the motor/generator is used as a primary drive power source while the other is used as an auxiliary drive power source.

Preferably, the automatic transmission provided in the present hybrid drive system is a planetary gear type or parallel two-axes type transmission having a plurality of operating positions having respective speed rations, which are selectively established by selective engagement and disengagement of coupling elements such as hydraulically operated friction clutches and brakes or positive clutches. The automatic transmission may be a continuously variable transmission of a belt-and-pulley type or toroidal type. Although an automatic transmission having different speed ratios is desirably used in the hybrid drive system according to the first aspect of the invention, in particular, the shift inhibiting means provides substantially the same advantage as described above even where the hybrid drive system uses a continuously variable transmission, provided that the speed ratio of this transmission is controlled so as to change in steps.

While the automatic transmission is required to be disposed between at least the engine and the vehicle drive wheel, the automatic transmission is preferably disposed in a power transmitting path which connects both of the engine and the motor/generator to the drive wheel.

The hybrid drive system according to any one of the first through fourth aspect of the invention may further comprises: manually operated member for establishing a drive-source braking mode in which the regenerative braking force and the engine braking force are applicable to the motor vehicle; and regenerative brake adjusting means for changing the regenerative braking force generated by the regenerative braking means in the drive-source braking mode, more specifically, the regenerative braking torque of the motor/generator. The regenerative braking and the engine braking are collectively referred to as "drive-source braking".

In the above case, the manually operated member may include a shift lever having a plurality of operating positions including a drive position in which the automatic transmission is selectively placed in one of a plurality of forward-drive positions according to the predetermined shift patterns, and a drive-source driving position, so that drive-source braking mode is established when the shift lever is operated the drive position to the drive-source drive position. The regenerative brake adjusting means may includes the shift lever which further includes a position to which the shift lever is operable from the drive-source braking position for changing the regenerative braking force generated by the regenerative braking means.

The regenerative braking means may be adapted to be automatically activated upon releasing of an accelerator pedal or depressing of a brake pedal, and the regenerative braking force generated by the regenerative braking means may be controlled as desired, for example, so that the vehicle speed when the accelerator pedal is in the non-operated state coincides with a predetermined target value.

BRIEF DESCRIPTION OF THE DRAWINGS

The above and other objects, features, advantages and technical and industrial significance of this invention will be better understood by reading the following detailed description of presently preferred embodiments of the invention, when considered in connection with the accompanying drawings, in which:

FIG. 3 is a view indicating operating states of various coupling elements for establishing different operating positions of an automatic transmission in the hybrid drive system of FIG. 1;

FIG. 8 is a view indicating nine operating modes which are selectively established in the sub-routine of FIG. 7;

FIG. 15 is a view indicating step SD12' implemented in place of step SD12 in the control routine of FIG. 14, in a fifth embodiment of the invention;

FIG. 16 is a view showing a column-type shift lever used in place of the shift lever of FIG. 4;

FIG. 24 is a view indicating operating states of coupling elements for establishing different operating positions of an automatic transmission in the hybrid drive system of FIG. 23.

DETAILED DESCRIPTION OF THE PREFERRED EMBODIMENTS

Figure 1:
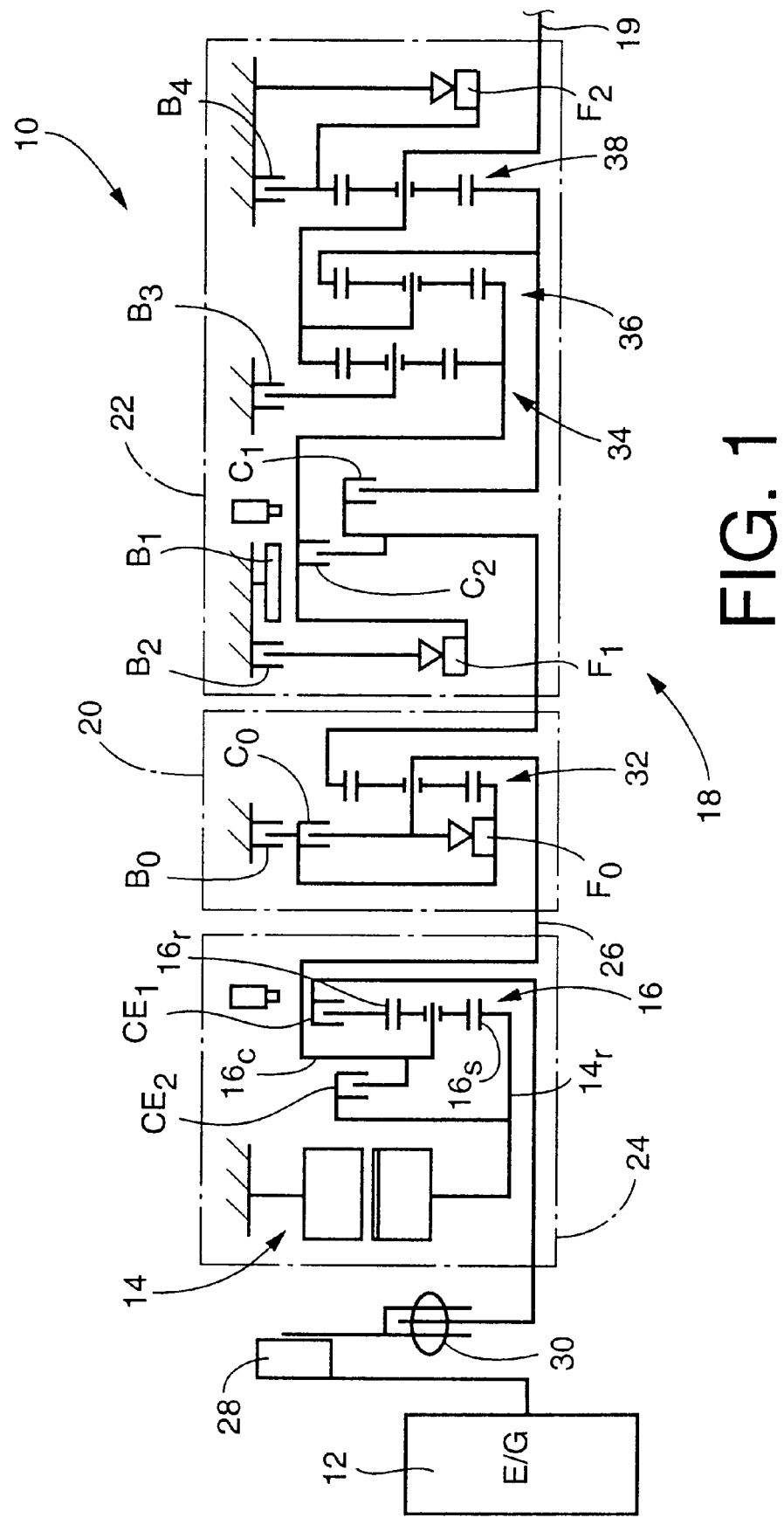
FIG. 1 is a schematic view illustrating a general arrangement of a hybrid vehicle drive system constructed according to a first embodiment of the present invention.

Referring first to the schematic view of FIG. 1, there is shown a hybrid drive system 10 adapted for use on a front-engine rear-drive motor vehicle (FR vehicle). The hybrid drive system 10 includes: an engine 12 such as an internal combustion engine, which is operated by combustion of a fuel; a motor/generator 14 which functions as an electric motor operated with an electric energy, and an electric generator; a planetary gear device 16 of single pinion type; and a power transmission device in the form of an automatic transmission 18. These engine 12, motor/generator 14, planetary gear device 16 and automatic transmission 18 are arranged in the longitudinal direction of the motor vehicle. The automatic transmission 18 has an output shaft 19 which is operatively connected to rear right and left drive wheels of the vehicle through a propeller shaft and a differential gear device (which are not shown), to transmit a drive force to the drive wheels.

The planetary gear device 16 functions as a synthesizing/distributing mechanism for mechanically synthesizing and distributing a force, and cooperates with the motor/generator 14 to constitute an electrically controlled torque converter 24 as indicated in one-dot chain line in FIG. 1. The planetary gear device 16 includes: a first rotary element in the form of a ring gear 16r connected to the engine 12 through a first clutch CE1; a second rotary element in the form of a sun gear 16s connected to a rotor shaft 14r of the motor/generator 14; and a third rotary element in the form of carrier 16c connected to an output shaft, which is an input shaft 26 of the automatic transmission 18. The sun gear 16s and carrier 16c are connected to each other through a second clutch CE2.

The engine 12 is connected to the first clutch CE1 through a flywheel 28 and a damper 30. The flywheel 28 and the damper 30 function to absorb speed and torque variations of the engine 12. The damper 30 includes an elastic member such as a spring or a rubber member. The first and second clutches CE1, CE2 are friction type multiple-disk clutches which are engaged and released by respective hydraulic actuators.

The automatic transmission 18 is a combination of a front auxiliary transmission 20 and a rear primary transmission 22. The auxiliary transmission 20 consists of an overdrive planetary gear set 32 of single pinion type, while the primary transmission 22 consists of three planetary gear sets 34, 36, 38 connected to each other. The primary transmission 22 has five forward-drive positions and one rear-drive position. The automatic transmission 18 functions as a power transmitting device disposed between the drive power source (12, 14) and the drive wheel of the vehicle.

The auxiliary transmission 20 includes frictionally coupling clutch C0 and brake B0 operated by respective hydraulic actuators, and a one-way clutch F0. The primary transmission 22 frictionally coupling clutches C1, C2 and brakes B1, B2, B3, B4 which are operated by respective hydraulic actuators, and one-way clutches F1, F2.

Figure 2:
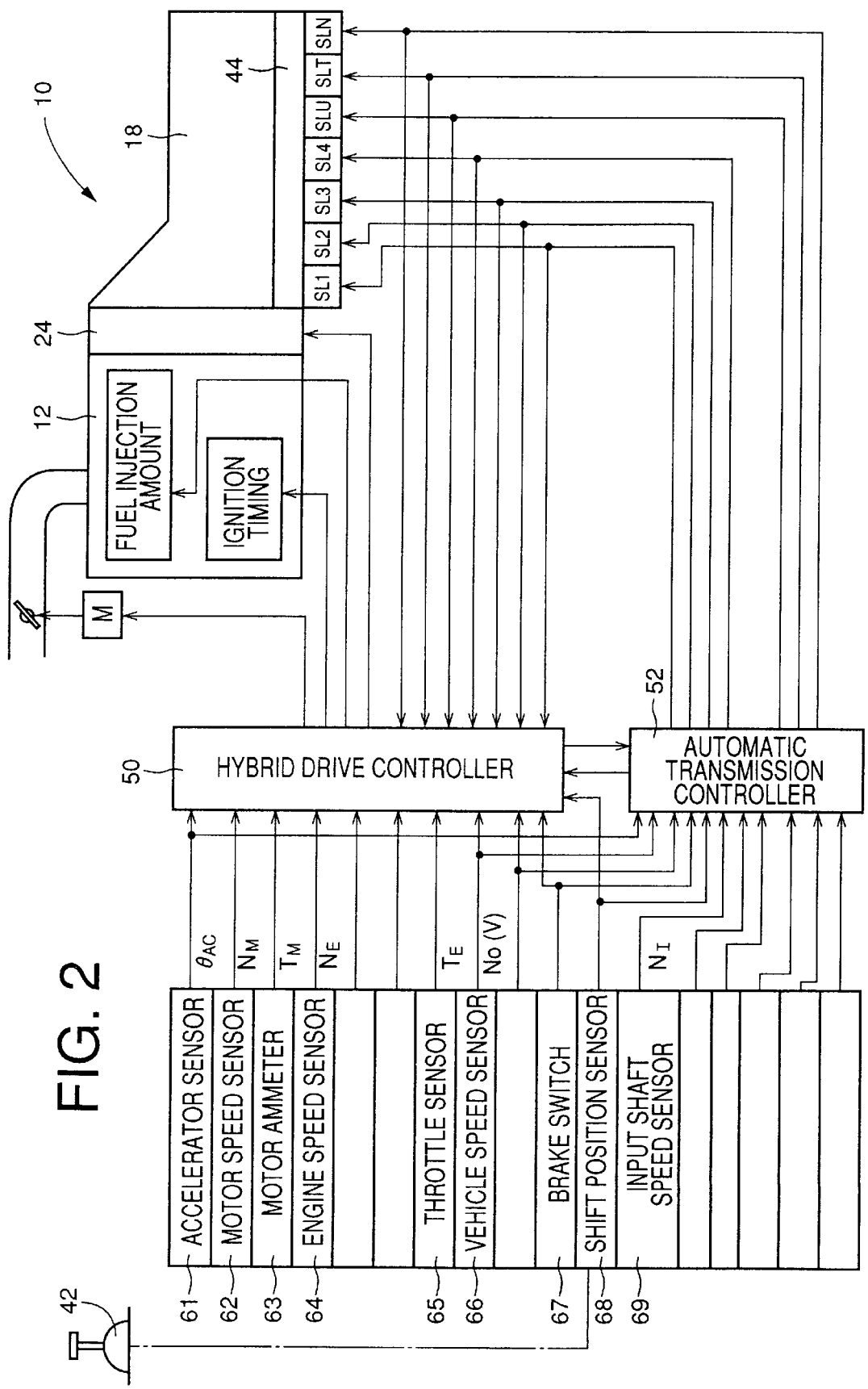
FIG. 2 is a view illustrating a control system used in the hybrid drive system of FIG. 1.

The automatic transmission 18 includes a hydraulic control device 44 incorporating solenoid-operated valves SL1–SL4 shown in FIG. 2. The solenoids of these solenoid-operated valves SL1–SL4 are selectively energized and deenergized to selectively engage and release the clutches C0, C1, C2 and brakes B0, B1, B2, B3, B4 for selectively establishing one of operating positions of the automatic transmission 18, as indicated in FIG. 3. The operating positions of the automatic transmission 18 consist of a neutral position "N", a rear-drive position "Rev", and five forward-drive positions, that is, first-speed position "1st", second-speed position "2nd", third-speed position "3rd", fourth-speed position "4th" and fifth-speed position "5th", as indicated in FIG. 3. The hydraulic control device 44 includes a manual shift valve which is mechanically connected through a push-pull cable 43 to a shift lever 42. The clutches C0–C2 and brakes B0–B4 are controlled by the solenoid-operated valves SL1–SL4 and the manual shift valve. The shift lever 42 has a parking position "P", a reverse position "R", a neutral position "N", a drive position "D", a fourth-speed position "4", a third-speed position "3", a second-speed position "2", a low-speed position "L", a drive-source braking position "B", a position "UP" and a position "DOWN". The positions "3", "2" and "L" are engine braking positions in which an engine brake may be applied to the vehicle. In the drive-source braking position "B", the engine 12 and the motor/generator 14 are used as the braking source.

Since the automatic transmission 18 and the electrically controlled torque converter 24 are symmetrical with respect to their centerline, only the upper halves of the transmission 28 and torque converter 24 are shown in FIG. 1.

In the table of FIG. 3, white circles indicate the engaged states of the clutches C, brakes B and one-way clutches F, while black circles indicate the engaged states of the clutch C0 and brakes B1, B4 when the shift lever is shifted to any one of the above-indicated engine braking positions "3", "2", "L" or when the hybrid drive system 10 is placed in an engine braking mode or a regenerative braking mode which will be described. The absence of the white or black circles indicates the released states of the clutches C, brakes B and one-way clutches F.

The clutch C0 and brakes B1 and B4 which are engaged for engine brake or regenerative brake application to the vehicle will be referred to as "coasting-brake coupling elements" where appropriate, since the engine or regenerative brake is usually applied to the vehicle during a coasting run of the vehicle with the accelerator pedal placed in the non-operated position.

The neutral position "N", rear-drive position "Rev" and engine braking positions "3", "2", "L" of the automatic transmission 18 are established by movements of the manual shift valve 41 mechanically connected to the shift lever 42. When the shift lever 240 is placed in the drive position "D", the automatic transmission 18 is automatically shifted to an appropriate one of the five forward-drive positions "1st" through "5th", with the solenoids of the solenoid-operated valves SL1–SL4 being selectively energized depending upon the running condition of the vehicle.

The speed ratios of the five forward-drive positions of the automatic transmission 18 decrease in steps from the speed ratio of the first-speed position "1st" to the speed ratio of the fifth-speed position "5th", as indicated in FIG. 3, by way of example only. The fourth-speed position "4th" has a speed ratio $i_4$ which is equal to 1. The planetary gear set 32 of the auxiliary transmission 20 has a gear ratio $\rho$, which is the number of teeth $Z_S$ of the sun gear divided by the number of teeth $Z_R$ of the ring gear. The gear ratio $\rho$ is smaller than 1. The fifth-speed position "5th" has a speed ratio $i_5$ which is equal to $1/(1+\rho)$.

The rear-drive position "Rev" of the automatic transmission 18 has a speed ratio $i_R$ which is equal to $1-1/p_2 \cdot p_3$, where $\rho_2$ and $\rho_3$ represent the gear ratios of the planetary gear sets 36, 38, respectively. The speed ratios of the rear-drive and forward-drive positions of the automatic transmission 18 are indicated in the table of FIG. 3, for illustrative purpose only.

Figure 4:
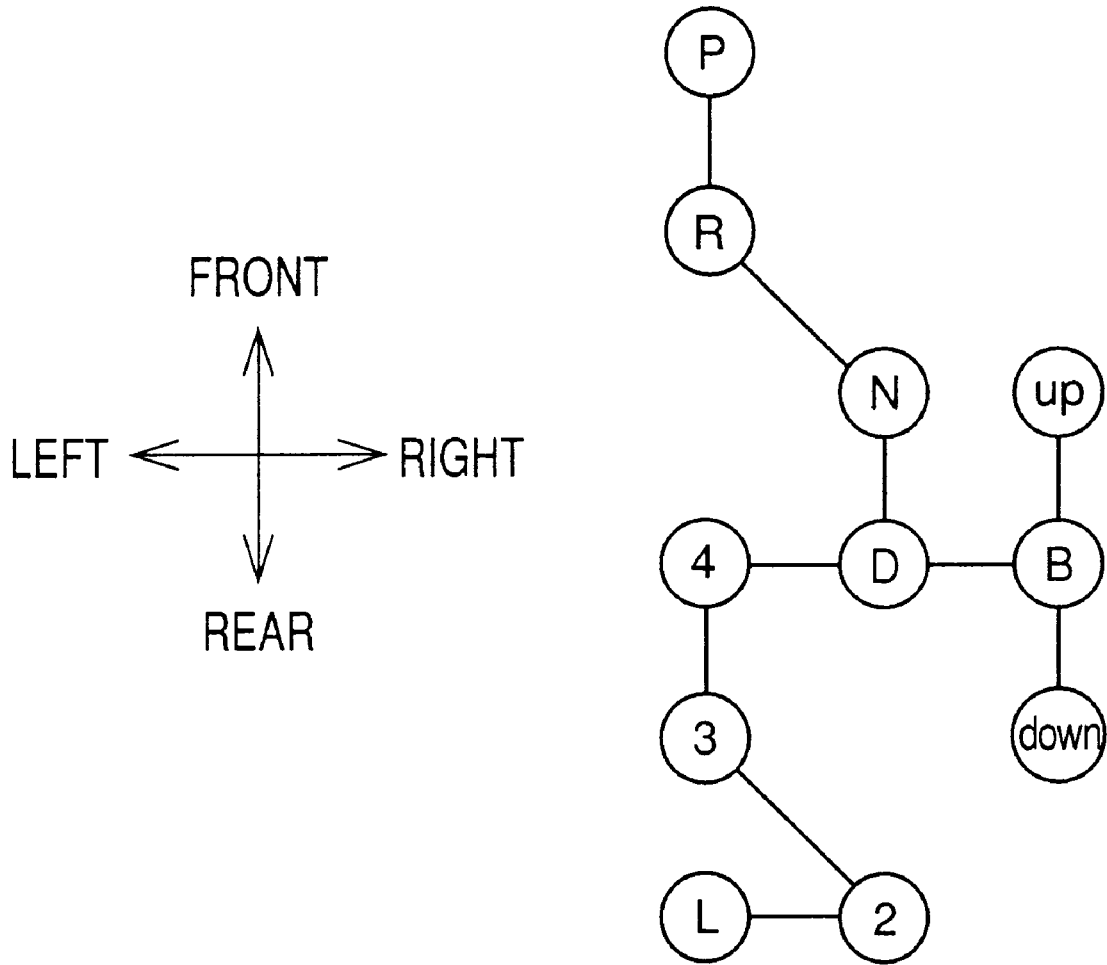
FIG. 4 is a view indicating operating positions of a shift lever for shifting the automatic transmission.

Referring to FIG. 4, there are shown the operating positions of the shift lever 42. That is, the shift lever 42 has six positions arranged in the longitudinal or running direction of the vehicle, and three positions arranged in the transverse or lateral direction of the vehicle. The shift lever 42 is supported by a suitable support device such that the shift lever 42 is operable to eleven operating positions indicated above, namely, parking position "P", reverse position "R", neutral position "N", drive position "D", fourth-speed position "4", engine braking positions "3", "2", "L", drive-source braking position "B", and positions "UP" and "DOWN".

When the shift lever 42 is operated to the drive-source braking position "B", the first and second clutches CE1 and CE2 are both engaged to establish a drive-source braking mode in which the engine 12 and the motor/generator 14 normally used as the drive power source are both used to apply both an engine brake and a regenerative brake to the vehicle. As described below in detail by reference to the flow chart of FIG. 9, the shift lever 42 may be operated by the vehicle operator from the drive-source braking position "B" to the position "UP" or "DOWN" to decrease or increase the regenerative braking torque $T_M$ of the motor/generator 14, whereby the total braking force applied to the vehicle in the drive-source braking mode can be adjusted by the vehicle operator, if the regenerative braking system (including the motor/generator 14 and storage device 58) is normally functioning. The amount of increase or decrease of the regenerative braking torque $T_M$ depends upon the time during which the shift lever 42 is placed in the position "UP" or "DOWN". If the shift lever 42 is operated from the braking position "B" to the position "UP" or "DOWN" where the regenerative braking system is not normally functioning, the automatic transmission 18 is shifted up or down, whereby the engine braking force is decreased or increased to adjust the total braking force in the drive-source braking mode can be adjusted.

It will be understood that the shift lever 42 functions as a manually operated member for establishing the drive-source braking mode, and also functions as regenerative brake adjusting means for adjusting the regenerative braking force generated by the motor/generator 14 in the drive-source braking mode.

As is apparent from the table of FIG. 3, the shifting actions of the automatic transmission 18 between the second-speed and third-speed positions "2nd" and "3rd" are effected by simultaneous engaging and releasing actions of the second and third brakes B2, B3. Described more specifically, the shift-up action from the second-speed position "2nd" to the third-speed position "3rd" is achieved by engaging the second brake B2 while releasing the third brake B3, and the shift-down action from the third-speed position "3rd" to the second-speed position "2nd" is achieved by engaging the third brake B3 while releasing the second brake B2. These shifting actions are referred to as "clutch-to-clutch" shifting actions, where appropriate. To achieve the clutch-to-clutch shifting actions in a smooth fashion, the hydraulic control device 44 is constructed as described below by reference to FIG. 5.

Figure 5:
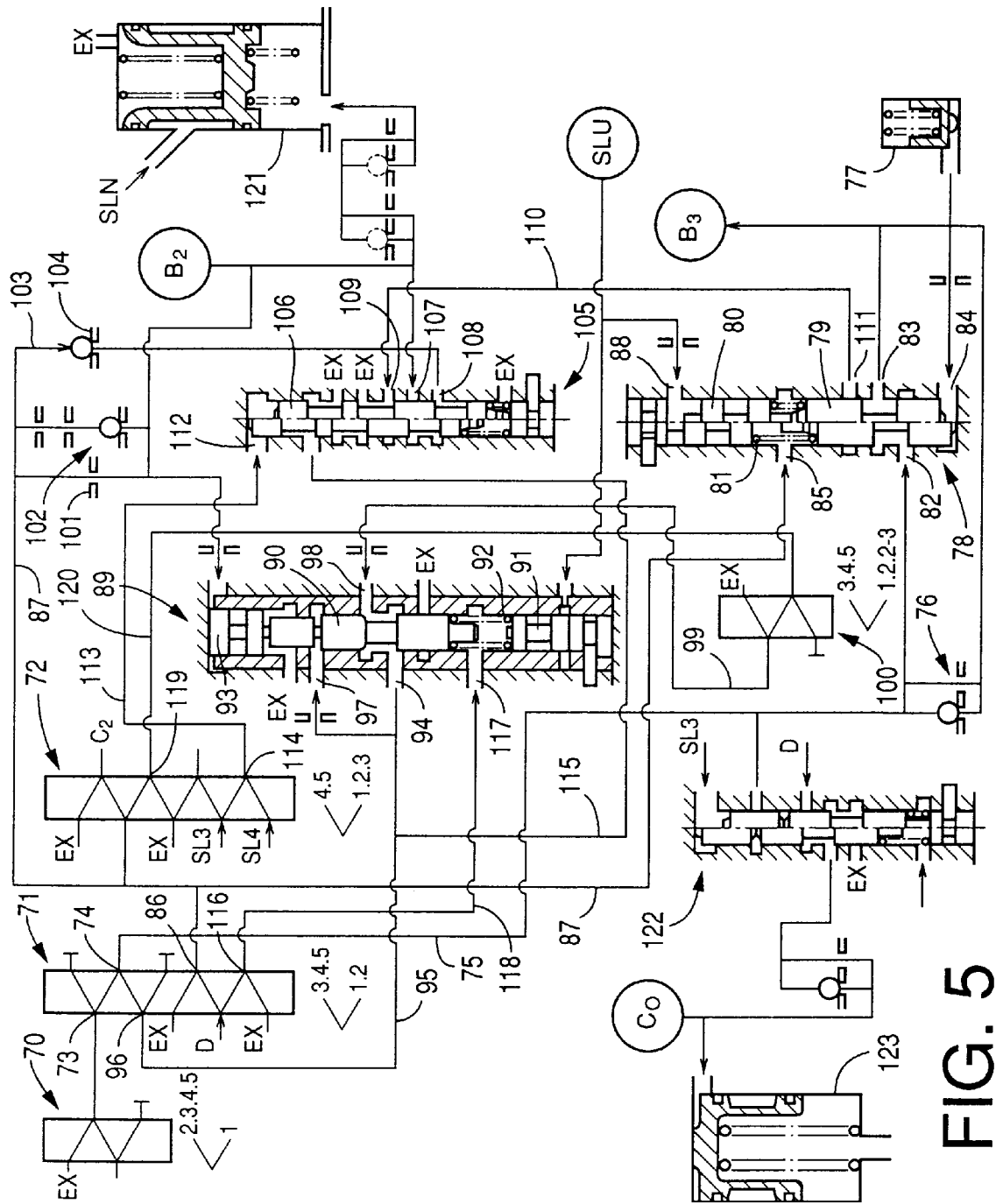
FIG. 5 is a view showing a part of a hydraulic system of the automatic transmission in the hybrid drive system of FIG. 1.

In FIG. 5, reference numerals 70, 71 and 72 denote a 1-2 shift valve, a 2-3 shift valve and a 3-4 shift valve, respectively. working fluid communications of ports of these shift valves 70, 71, 72 are indicated below the shift valves as shown in FIG. 5 in which the five forward-drive positions "1st", "2nd", "3rd", "4th" and "5th" are represented as "1", "2", "3", "4" and "5", respectively.

The 2-3 shift valve 71 has an input port 73 and a brake port 74 which communicate with each other when the automatic transmission 18 is placed in the first-speed position "1st" or the second-speed position "2nd". The above-indicated third brake B3 is connected to the brake port 74 through an oil passage 75. The oil passage 75 has an orifice 76, and a damper valve 77 is connected between the orifice 76 and the third brake B3. The damper valve 77 functions to absorb a small amount of the working oil to thereby achieve a damping action upon an abrupt rise of a line pressure PL applied to the third brake B3.

Reference numeral 78 in FIG. 5 denotes a B-3 control valve which is provided to directly regulate the engaging pressure of the third brake B3. The B-3 control valve 78 includes a spool 79, a plunger 80, and a spring 81 disposed between the spool 79 and the plunger 80. The B-3 control valve 78 has an input port 82 which is opened and closed by the spool 79 and to which the oil passage 75 is connected, and an output port 83 which is selectively communicable with the input port 82 and to which the third brake B3 is connected. The output port 82 is connected to a feedback port 84 which is partially defined by one end of the spool 79.

The B-3 control valve 78 further has a sort 85 communicating with a chamber in which the spring 79 is disposed The 2-3 shift valve 71 has a port 86 which produces a hydraulic pressure output (line pressure PL) when the automatic transmission 18 is placed in one of the forward-drive positions "3rd", "4th" and "5th". The port 86 is connected to the port 85 of the B-3 control valve 78 through an oil passage 87. The B-3 control valve 78 further has a control port 88 adjacent to one end of the plunger 80, and a linear solenoid valve SLU (FIG. 2) is connected to the control port 88, so that a pilot pressure $P_{SLU}$ generated by the linear solenoid valve SLU is applied to the control port 88. in this arrangement, the hydraulic pressure is regulated by the B-3 control valve 78, on the basis of the elastic force of the spring 81 and the hydraulic pressure applied to the port 85. The elastic force of the spring 81 increases with an increase in the pilot pressure $P_{SLU}$ applied to the control port 88.

Reference numeral 89 in FIG. 5 denotes a 2-3 timing valve which includes a spool 90, a first plunger 91, a spring 92 disposed between the spool 90 and the first plunger 91, and a second plunger 93 disposed on the side of the spool 90 remote from the first plunger 91. the spool 90 has a small-diameter land and two large-diameter lands having a larger diameter than the small-diameter land. The 2-3 timing valve 89 has a port 94 formed at an intermediate portion thereof. An oil passage 95 is connected to the port 94, and to a port 96 of the 2-3 shift valve 71, which port 96 is communicated with the brake port 74 when the automatic transmission 18 is placed in one of the forward-drive positions "3rd", "4th" and "5th".

The oil passage 95 has a branch connected through an orifice to a port 97 of the 2-3 timing valve 89, which port 97 is open between the above-indicated small-diameter land one of the two large-diameter lands of the spool 90. The 2-3 timing valve 89 further has a port 98 which is selectively communicable with the above-indicated port 94 and which is connected through an oil passage 99 to a solenoid relay valve 100.

The 2-3 timing valve 89 further has a port which is adjacent to one end of the first plunger 91 and which is connected to the linear solenoid valve SLU, and another port which is adjacent to one end of the second plunger 93 and which is connected through an orifice to the second brake B2.

The above-indicated oil passage 87 is provided to supply the working oil to the second brake B2 and to discharge the oil from this second brake B2. The oil passage 87 is provided with an orifice 401 having a small diameter, and an orifice 102 with a check ball. The oil passage 87 has a branch 103 which is provided with an orifice 104 having a large diameter. The orifice 104 is provided with a check ball which is moved to an open position when the oil is discharged from the second brake B2. The branch 103 is connected to an orifice control valve 105 described below.

The orifice control valve 105 is provided to control the rate of discharge flow of the oil from the second brake B2. This orifice control valve 105 includes a spool 106, and has a port 107 at an intermediate position. The port 107 is opened and closed by the spool 106 and connected to the second brake B2. The orifice control valve 105 further has a port 108 formed at a position below the port 107 as seen in FIG. 5. The above-indicated branch 103 of the oil passage 87 is connected to the port 108. The orifice control valve 105 further has a port 108 formed at a position above the port 107 as seen in FIG. 5.

The port 108 is selectively communicable with a drain port and is connected through an oil passage 110 to a port 111 of the B-3 control valve 78. The port 111 is selectively communicable with the output port 83 to which she third brake B3 is connected.

The orifice control valve 105 further has a control port 112 formed adjacent to one end of the spool 106 remote from the spring which acts on the spool 106. This control port 112 is connected through an oil passage 113 to a port 114 of the 3-4 shift valve 72. This port 114 produces an output pressure of the third solenoid-operated valve SL3 when the automatic transmission 18 is placed in any one of the forward-drive positions "3rd", "2nd" and "1st", and produces an output pressure of the fourth solenoid-operated valve SL4 when the automatic transmission 18 is placed in the fourth-speed position "4th" or fifth-speed position "5th".

The oil passage 95 has a branch 115 which is connected to the orifice control valve 105. The branch 115 is selectively communicable with the drain port of the orifice control valve 105.

The 2-3 shift valve 71 has a port 116 which produces the hydraulic pressure output (line pressure PL) when the automatic transmission 18 is placed in the first-speed position "1st" or second-speed position "2nd". This port 116 is connected through an oil passage 118 to a port 317 of the 2-3 timing valve 89 which is open to a chamber in which the spring 92 is disposed. The 3-4 shift valve 72 has a port 119 which is communicated with the above-indicated oil passage 87 when the automatic transmission 18 is placed in any one of the positions "3rd", "2nd" and "1st". The port 119 is connected through an oil passage 120 to a solenoid relay valve 100.

Reference numeral 121 in FIG. 5 denotes an accumulator for the second brake B2. The accumulator 121 has a back-pressure chamber to which is applied an accumulator control pressure which is regulated on the basis of an output pressure of a linear solenoid valve SLN (FIG. 2) such that the accumulator control pressure increases with a decrease in the output pressure of the linear solenoid valve SLN. Accordingly, the hydraulic pressures for engaging and releasing the second brake B2 increase as a pilot pressure applied to the linear solenoid valve SLN decreases.

Reference numeral 122 in FIG. 5 denotes a C-0 exhaust valve, and reference numeral 123 denotes an accumulator for the clutch C0. The C-0 exhaust valve 122 is operated to place the clutch C0 in the engaged state for applying an engine brake to the vehicle when the automatic transmission 18 is shifted to the second-speed position "2nd" while the shift lever is placed in the position "2".

The other clutches C1, C2 and brake B0 for shifting the automatic transmission 14 are also provided with respective accumulators to which is applied the accumulator control pressure so that the pressures of the clutches C1, C2 and brake B0 are controlled depending upon an torque $T_I$ of the input shaft 26 during the appropriate shifting actions of the automatic transmission 14.

In the hydraulic control device 44 constructed as described above, the engaging pressure $P_{B3}$ of the third brake B3 can be regulated directly by the B-3 control valve 78 when the port 111 of the B-3 control valve 78 is drained. The B-3 control valve 78 is controlled by the linear solenoid valve SLU to regulate the engaging pressure of the third brake B3.

When the spool 106 of the orifice control valve 105 is placed in its left position as indicated in FIG. 5, the working fluid can be discharged from the second brake B2 through the orifice control valve 105, and the releasing speed of the second brake B2 can be controlled by the controlled rate of flow of the fluid through the orifice control valve 105.

The clutch-to-clutch shift-up action of the automatic transmission 18 from the second-speed position "2nd" to the third-speed position "3rd" is effected by slowly releasing the third brake B3 while at the same time slowly engaging the second brake B2. To effectively reduce a shifting shock upon this clutch-to-clutch shift-up action, the hydraulic pressure $P_{B3}$ of the third brake B3 during its releasing action is controlled by the linear solenoid valve SLU on the basis of the input torque $T_I$ of the input shaft 26 of the automatic transmission 18. The pressure $P_{B3}$ may be controlled in a feedback fashion on the basis of the input torque $T_I$ obtained from time to time during a shifting action. Alternatively, the pressure $P_{B3}$ may be controlled on the basis of the input torque $T_I$ obtained upon initiation of the shifting action.

As shown in FIG. 2, the hybrid drive system 10 includes a hybrid drive controller 50 as well as the automatic transmission controller 52 indicated above. Each of these controllers 50, 52 is constituted principally by a microcomputer incorporating a central processing unit (CPU), a random-access memory (RAM), and a read-only memory (ROM). The controllers 50, 52 receive output signals of various detectors or sensors which include: an accelerator sensor 61 for detecting an operating amount $\theta_{AC}$ of an accelerator pedal; a motor speed sensor 62 for detecting speed $N_M$ of the motor/generator 14; a motor ammeter 63 for detecting an electric current of the motor/generator 14, which indicates torque $T_M$ of the motor 14; an engine speed sensor 64 for detecting speed $N_E$ of the engine 12; a throttle sensor 65 for detecting the opening angle of a throttle valve, which indicates torque $T_E$ of the engine 12; a vehicle speed sensor 66 for detecting speed $N_O$ of the output shaft 19 of the automatic transmission 18, which indicates running speed V of the motor vehicle; a brake switch 67 for detecting an operation of a brake pedal; a shift position sensor 68 for detecting the currently selected position of the shift lever; and an input shaft speed sensor 69 for detecting speed $N_I$ of the input shaft 26 of the automatic transmission 18.

While the torque $T_E$ of the engine 12 can be obtained from the throttle opening angle, as indicated above, it may also be obtained from the amount of fuel injection into the engine 12.

The hybrid drive controller 50 is adapted to control the opening angle of the throttle valve, and the fuel injection and ignition timing of the engine 12, so that the output of the engine 12 is controlled depending upon the specific running condition of the vehicle.

Figure 6:
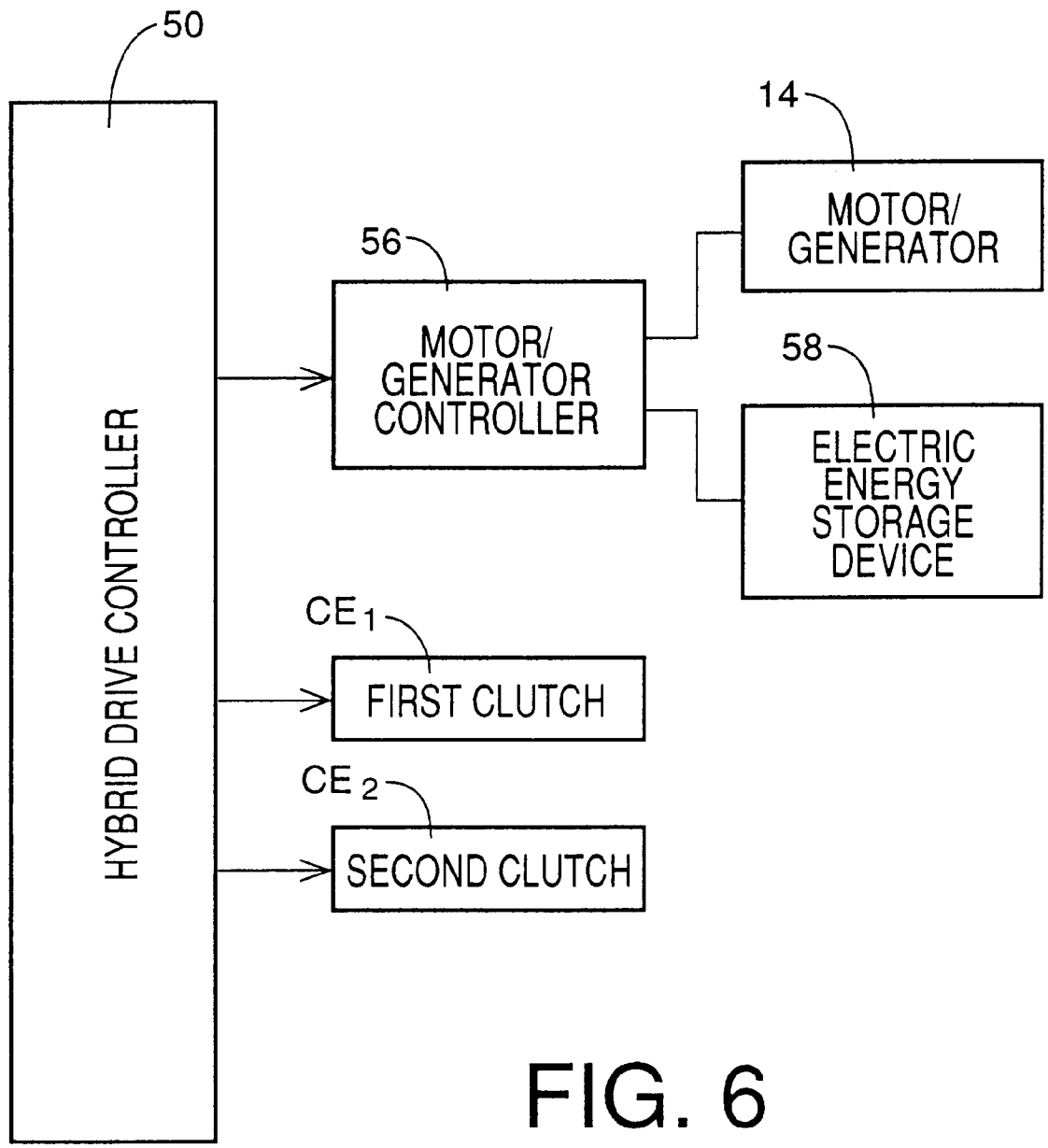
FIG. 6 is a block diagram showing connection between a hybrid drive controller shown in FIG. 2 and an electrically operated torque converter shown in FIG. 1.

The motor/generator 14 is connected to an electric energy storage device 58 through a motor/generator controller 56, as indicated in FIG. 6. The hybrid drive controller 50 is adapted to control the motor/generator controller 56 to place the motor/generator 14 selectively in one of a DRIVE state, a CHARGING state and a NON-LOAD or FREE state. In the DRIVE state, the motor/generator 214 is operated as an electric motor to provide a predetermined torque, with an electric energy being supplied thereto from the electric energy storage device 58. In the CHARGING state, the motor/generator 14 is operated as an electric generator or dynamo, by regenerative braking (i.e., electric braking torque of the motor/generator per se), so as to charge the electric energy storage device 58 with the electric energy. In the NON-LOAD or FREE state, the motor/generator 14 is placed in a non-load condition permitting free rotation of the rotor shaft 14r.

An amount of electric energy SOC stored in the electric energy storage device 58 can be obtained from the electric current or charging efficiency of the motor/generator 14 when it is operated as the electric generator to charge the storage device 58.

The first and second clutches CE1, CE2 are controlled by the hybrid drive controllers 50 through solenoid-operated valves of the hydraulic circuit. The automatic transmission 18 is controlled by the automatic transmission controller 252 through the above-indicated solenoid-operated valves SL1–SL4 and linear solenoid valves SLU, SLT and SLN of the hydraulic control device 44, so that the automatic transmission 18 is shifted to the optimum position depending upon the running condition of the vehicle, for example, depending upon the operation amount $\theta_{AC}$ of the accelerator pedal and the vehicle running speed V, and according to a selected one of predetermined shift patterns.

Figure 7:
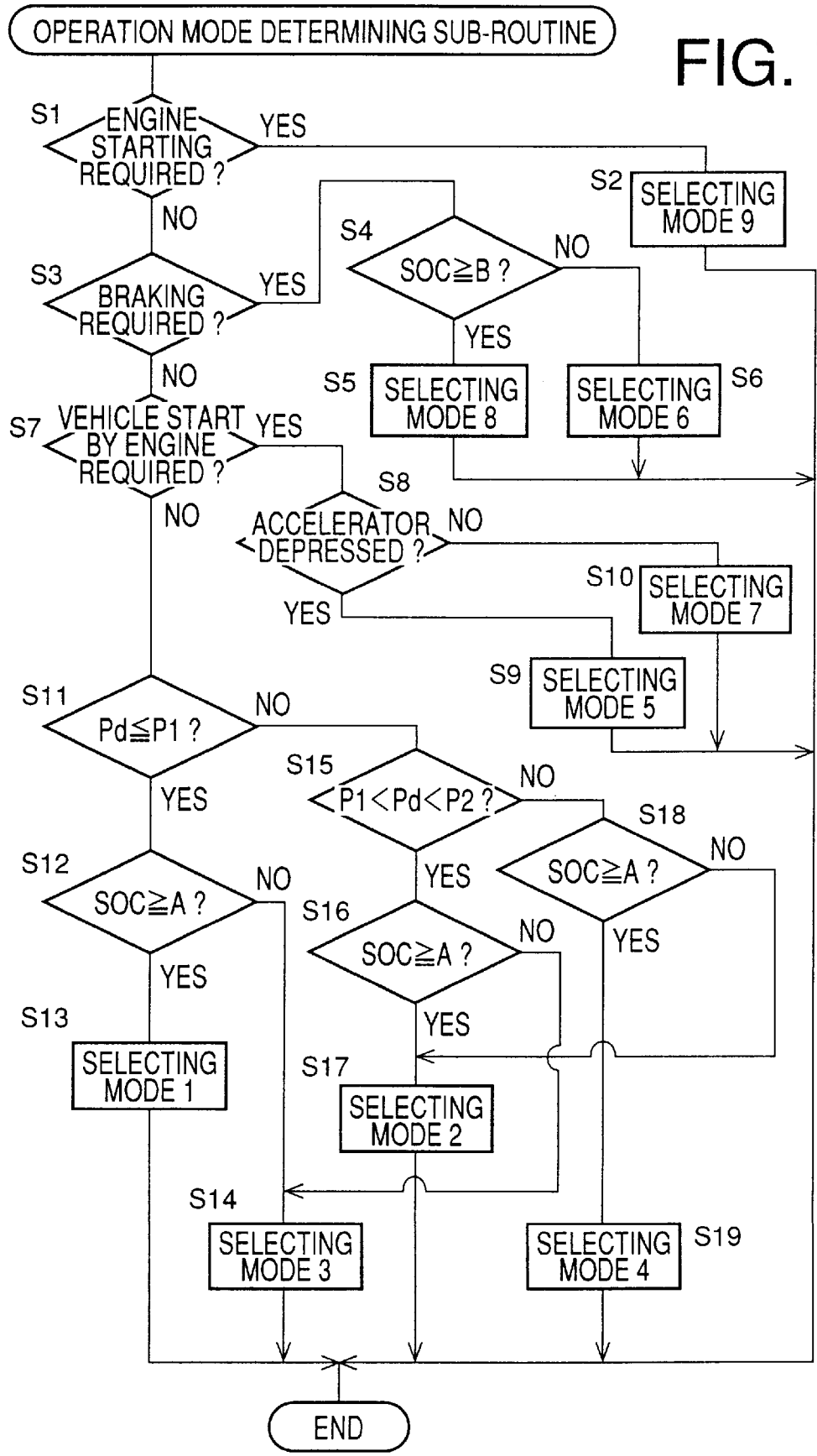
FIG. 7 is a flow chart illustrating an operation mode determining sub-routine executed by the hybrid drive controller.

The hybrid drive controller 50 is adapted to execute an operation mode determining sub-routine illustrated in the flow chart of FIG. 7, for selecting one of nine operation modes of the hybrid drive system 10 indicated in FIG. 8, and for operating the engine 12 and the electrically controlled torque converter 24 in the selected mode, as disclosed in U.S. patent application Ser. No. 08/746,483 filed Nov. 12, 1996. As shown in FIG. 2, the hybrid drive controller 50 is adapted to receive the output signals of the various sensors described above.

The operation mode determining sub-routine of FIG. 7 is initiated with step S1 to determine whether there exists a command requiring the engine 12 to be started, for driving the vehicle with the engine 12 used as the drive power source or for operating the motor/generator 14 for charging the electric energy storage device 58.

If an affirmative decision (YES) is obtained in step S1, the control flow goes to step S2 to select an operation mode 9. In this operation mode 9, the first and second clutches CE1, CE2 are both engaged (turned ON) as indicated in the table of FIG. 8, and the motor/generator 14 is operated to start the engine 12 through the planetary gear device 16, with the fuel injection amount and other conditions of the engine 10 being suitably controlled.

When this operation mode 9 is selected while the vehicle is stationary, the starting of the engine 12 is effected with the automatic transmission 18 placed in the neutral position "N". When the operation mode 9 is selected during running of the vehicle with the motor/generator 14 as the drive power source as in an operation mode 1 in which the first clutch CE1 is in the released state, the first clutch CE1 is engaged, and the motor/generator 14 is operated so as to provide an output which is larger than the output necessary to drive the vehicle by a given surplus amount, so that the engine 12 is started by the surplus output of the motor/generator 14.

Even when the vehicle is running, the engine 12 can be started in the operation mode 9 by temporarily placing the automatic transmission 18 in the neutral position. Thus, the engine 12 can be started by the motor/generator 14. This arrangement eliminates an exclusive starter (e.g., electric motor) for starting the engine 12, whereby the hybrid drive system 10 is available at a reduced cost.

If a negative decision (NO) is obtained in step S1, that is, if no command requiring the starting of the engine 12 is present, the control flow goes to step S3 to determine whether brake application to the vehicle is required. This determination may be effected on the basis of the output signal of the brake switch 67.

If an affirmative decision (YES) is obtained in step S3, the control flow goes to step S4 to determine whether the amount of electric energy SOC stored in the electric energy storage device 58 is equal to or larger than a predetermined upper limit B. If an affirmative decision (YES) is obtained in step S4, the control flow goes to step S5 to select an operation mode 8 (engine braking mode). If a negative decision (NO) is obtained in step S4, the control flow goes to step S6 to select an operation mode 6 (regenerative braking mode). The upper limit B is an upper limit of the stored electric energy amount SOC below which the electric energy storage device 58 is permitted to be charged. The upper limit B is determined depending upon the charging and discharging efficiencies of the electric energy storage device 58. For instance, the upper limit B is about 80% of the full capacity of the electric energy storage device 58.

It will be understood that step S6 corresponds to regenerative braking means for applying to the vehicle a regenerative brake force corresponding to an amount of electric energy generated by the motor/generator 14 when the motor/generator 14 is operated by a kinetic energy of the running vehicle.

In the operation mode 8 selected in step S5, the first and second clutches CE1, CE2 are both engaged (turned ON), as indicated in the table of FIG. 8, and the motor/generator 14 is placed in the NON-LOAD state. Further, the engine 12 is turned OFF, that is, the throttle valve is closed, and the fuel injection amount if zeroed. As a result, an engine brake due to the drag resistance of the engine 12 is applied to the vehicle, whereby the required amount of operation of the brake pedal by the vehicle operator is reduced, facilitating the control of the vehicle running. Since the motor/generator 214 is placed in the NON-LOAD state and permitted to rotate freely in the operation mode 8, the electric energy storage device 58 is protected from excessive charging and resulting deterioration of its charging and discharging efficiencies.

It will be understood that step S5 corresponds to engine braking means for applying to the vehicle an engine braking force corresponding to a resistance to rotation of the engine 12 when the engine 12 is operated by a kinetic energy of the running vehicle.

In the operation mode 6 selected in step S6, the first clutch CE1 is released (turned OFF) and the second clutch CE2 is engaged (turned ON), while the engine 212 is turned OFF, and the motor/generator 14 is placed in the CHARGING state, as indicated in the table of FIG. 8, whereby the motor/generator 14 is driven by a kinetic energy of the motor vehicle, so as to charge the electric energy storage device 58 while applying a regenerative brake to the vehicle. The regenerative braking reduces the required amount of operation of the brake pedal and facilitates the control of the vehicle running.

In the operation mode 6 wherein the engine 12 is disconnected from the planetary gear device 16 with the first clutch CE1 placed in the released state, the energy loss of the vehicle due to the drag resistance of the engine 12 is prevented. Further, since the operation mode 6 is selected when the stored electric energy amount SOC is smaller than the upper limit B, the electric energy storage device 58 is protected from excessive charging and resulting deterioration of its charging and discharging efficiencies.

If a negative decision (NO) is obtained in step S3, that is, if no command requiring brake application to the vehicle is present, the control flow goes to step S7 to determine whether the vehicle is required to be started by operation of the engine 12. This determination may be effected by determining whether the vehicle is in a temporary stop during running of the vehicle with the engine 212 used as the drive power source as in an operation mode 3 (which will be described). For instance, the temporary stopping of the vehicle can be detected by checking if the output speed $N_O$ of the output shaft 19 of the automatic transmission 18 is zero. Namely, the output shaft speed $N_O$ is zero when the vehicle is stationary.

If an affirmative decision (YES) is obtained in step S7, the control flow goes to step S8 to determine whether the accelerator pedal is in a depressed state, more specifically, whether the operation amount $\theta_{AC}$ of the accelerator pedal is larger than a predetermined lower limit which is close to zero but larger than zero. If an affirmative decision (YES) is obtained in step S8, that is, if the accelerator pedal is in a depressed state, the control flow goes to step S9 to select an operation mode 5. If a negative decision (NO) is obtained in step S8, the control flow goes to step S10 to select an operation mode 7.

In the operation mode 5 selected in step S9, the first clutch CE1 is engaged (turned ON) and the second clutch CE2 is released (turned OFF), and the engine 12 is operated, as indicated in the table of FIG. 8, whereby the vehicle is started by the engine 12, with the regenerative braking torque of the motor/generator 14 being suitably controlled.

Described in detail, the ratios of the engine torque $T_E$, output torque of the planetary gear device 16 and motor torque $T_M$ are 1:(1+ρE):ρE, where ρE represents a gear ratio of the planetary gear device 16 (ρ=number of teeth of the sun gear 16s divided by number of teeth of the ring gear 16r). When the gear ratio ρE is about 0.5 (as in a common planetary gear device), for example, the torque of the motor/generator 14 is controlled to be equal to a half of the engine torque $T_E$, so that the torque about 1.5 times the engine torque $T_E$ is produced from the carrier 16c of the planetary gear device 16.

In the above arrangement, the vehicle can be started with a torque as large as (1+ρE)/ρE times the torque of the motor/generator 14. If the motor/generator 14 is held in the NON-LOAD state with no current applied to the motor, the output of the carrier 16c is zeroed with the rotor shaft 14r merely rotating in the reverse direction, whereby the vehicle is held stationary.

In the above case, the planetary gear device 16 functions as a vehicle start clutch and a torque booster. With the motor torque $T_M$ (regenerative braking torque) gradually increased from zero to increase a reaction force of the motor/generator 14, the vehicle can be smoothly started with the output torque which is (1+ρ) times the engine torque $T_E$.

The motor/generator 14 used in the hybrid drive system 10 of the present embodiment has a torque capacity which is about ρE times the maximum torque of the engine 12. Namely, the torque capacity and size of the motor/generator 14 are minimized to minimize the size and cost of manufacture of the hybrid drive system 10, while assuring the required torque.

The present hybrid drive system 10 is further adapted so that the opening angle of the throttle valve and the fuel injection amount are increased with an increase in the motor torque $T_M$, for preventing stalling of the engine 12 due to a drop of the engine speed $N_E$ due to an increase in the reaction force of the motor/generator 14.

In the operation mode 7 selected in step S10, the first clutch CE1 is engaged (turned ON) and the second clutch CE2 is released (turned OFF), and the engine 12 is operated while the motor/generator 14 is placed in the NON-LOAD state so that the hybrid drive system 10 is placed in an electrically neutral state, as indicated in the table of FIG. 8. In this operation mode 7, the output of the carrier 16c is zeroed with the rotor shaft 14r of the motor/generator 214 rotating freely in the reverse direction. When this operation mode 7 is established during running of the vehicle with the engine 12 operated as the drive power source as in the operation mode 3, the stopping of the vehicle does not require the engine 12 to be turned OFF, and the vehicle can be started by the engine 10 as in the operation mode 5.

If a negative decision (NO) is obtained in step S7, that is, if the starting of the vehicle by the engine 12 is not required, the control flow goes to step S11 to determine whether a currently required output Pd of the hybrid drive system 10 is equal to or smaller than a predetermined first threshold value P1. The currently required output Pd is an output of the hybrid drive system 210 required to drive the vehicle against a running resistance. This currently required output Pd is calculated according to a predetermined data map or equation, on the basis of the operation amount $\theta_{AC}$ of the accelerator pedal, a rate of change of this value $\theta_{AC}$, running speed of the vehicle (speed $N_O$ of the output shaft 19), or the currently established operating position of the automatic transmission 18.

The predetermined first threshold value P1 is a boundary value of the output above which the vehicle is driven with only the engine 12 used as the drive power source and below which the vehicle is driven with only the motor/generator 14 as the drive power source. In other words, the vehicle is considered to be in a medium-load or high-load running state if the currently required output Pd is larger than the first threshold value P1, and in a low-load running state if the currently required output Pd is equal to or smaller than the first threshold value P1. For example, the first threshold value P1 is determined by experiments, so as to minimize the exhaust gas emissions and the fuel consumption, depending upon the energy efficiency during running of the vehicle (in which the electric energy storage device 58 may be charged by operation of the engine 12).

If the currently required output Pd is equal to or smaller than the first threshold value P1, the control flow goes to step S12 to determine whether the stored electric energy amount SOC is equal to or larger than a predetermined lower limit A. If an affirmative decision (YES) is obtained in step S12, the control flow goes to step S13 to select an operation mode 1. If a negative decision (NO) is obtained in step S12, the control flow goes to step S14 to select an operation mode 3.

The lower limit A is a lower limit of the stored electric energy amount SOC above which the electric energy stored in the storage device 58 can be used to operate the motor/generator 14 as the drive power source. The lower limit A is determined depending upon the charging and discharging efficiencies of the storage device 58. For instance, the lower limit A is about 70% of the full capacity of the storage device 58.

In the operation mode 1 selected in step S13, the first clutch CE1 is released (turned OFF) and the second clutch CE2 is engaged (turned ON), and the engine 12 is turned OFF, while the motor/generator 14 is operated so as to provide the currently required output Pd, as indicated in the table of FIG. 8, so that the vehicle is driven with only the motor/generator 14 used as the drive power source.

In this operation mode 1, too, the engine 12 is disconnected from the planetary gear device 16, so that the energy loss due to the drag resistance of the engine 12 is prevented as in the operation mode 6, and the motor can be suitably operated with high efficiency with the automatic transmission 18 being suitably shifted.

It is also noted that the operation mode 1 is selected, that is, the motor/generator 14 is used as the drive power source, when the currently required output Pd is equal to or smaller than the first threshold value P1 while the electric energy amount SOC stored in the storage device 58 is equal to or larger than the lower limit A. In this condition, the energy efficiency is higher and the fuel consumption and the amount of exhaust emissions can be made smaller when the vehicle is driven by the motor/generator 14 (in the operation mode 1) than when the vehicle is driven by the engine 12 (in the operation mode 2). Further, the electric energy storage device 58 is protected from excessive energy consumption with the stored electric energy amount SOC falling below the lower limit A, which would result in deterioration of the charging and discharging efficiencies of the storage device 58.

In the operation mode 3 selected in step S14, the first and second clutches CE1, CE2 are both engaged (turned ON), and the engine 12 is turned ON, while the motor/generator 14 is placed in the CHARGING state to charge the electric energy storage device 58 with regenerative braking, as indicated in the table of FIG. 8, whereby the vehicle is driven by the output of the engine 12 while the electric energy storage device 58 is charged with the electric energy generated by the motor/generator 14. In this operation mode 3, the engine 12 is operated so as to provide an output larger than the currently required output Pd, and the electric current of the motor/generator 14 is controlled so that a surplus output of the engine 12 is consumed by the motor/generator 14 to charge the storage device 258.

If a negative decision (NO) is obtained in step S11, that is, if the currently required output Pd is larger than the first threshold value P1, the control flow goes to step S15 to determine whether the currently required output Pd is smaller than a predetermined second threshold P2 which is larger than the first threshold P1, that is, whether the currently required output Pd is larger than the first threshold P1 and smaller than the second threshold P2, namely, within a predetermined range between P1 and P2.

This second threshold value P2 is a boundary value of the output below which the vehicle is driven with only the engine 12 used as the drive power source and above which the vehicle is driven with both the engine 12 and the motor/generator 14 as the drive power sources. In other words, the vehicle is considered to be in the medium-load running state if the currently required output Pd is smaller than the second threshold value P2, and in the high-load running state if the currently required output Pd is equal to or larger than the second threshold value P2. For example, the second threshold value P2 is determined by experiments, so as to minimize the exhaust gas emissions and the fuel consumption, depending upon the energy efficiency during running of the vehicle (in which the electric energy storage device 58 may be charged by operation of the engine 12).

If the currently required output Pd is larger than the first threshold P1 and smaller than the second threshold P2, that is, if an affirmative decision (YES) is obtained in step S15, the control flow goes to step S16 to determine whether the storage electric energy amount SOC is equal to or larger than the above-indicated predetermined lower limit A. If an affirmative decision (YES) is obtained in step S16, the control flow goes to step S17 to select an operation mode 2. If a negative decision (NO) is obtained in step S16, the control flow goes to step S14 to select the operation mode 3 discussed above.

If the currently required output Pd is equal to or larger than the second threshold P2, that is, if a negative decision (NO) is obtained in step S15, the control flow goes to step S18 to determine whether the stored electric energy amount SOC is equal to or larger than the lower limit A. If an affirmative decision (YES) is obtained in step S18, the control flow goes to step S19 to select an operation mode 4. If a negative decision (NO) is obtained in step S18, the control flow goes to step S17 to select the operation mode 2.

In the operation mode 2 selected in step S17, the first and second clutches CE1, CE2 are both engaged (turned ON), and the engine 12 is operated so as to produce the currently required output Pd, while the motor/generator 14 is placed in the NON-LOAD state, as indicated in FIG. 8, whereby the vehicle is driven with only the engine 12 used as the drive power source.

In the operation mode 4 selected in step S19, the first and second clutches CE1, CE2 are both engaged (turned ON), and the engine 12 and the motor/generator 14 are both operated, as indicated in the table of FIG. 8, whereby the vehicle is driven with both the engine 12 and the motor/generator 14 used as the drive power sources.

In the operation mode 4 selected when the currently required output Pd is equal to the second threshold P2 or larger, the engine 12 and the motor/generator 14 are both operated as the drive power sources to drive the vehicle, so that the energy efficiency is less likely to be lowered than in the operation mode 1 or 2 in which either the engine 12 or the motor/generator 14 is used as the drive power source. In this respect, the fuel consumption and the exhaust gas emissions can be made smaller in this operation mode 4 than in the operation mode 1 or 2 when the currently required output Pd is equal to the second threshold P2 or larger. Further, since the operation mode 4 is selected only when the stored electric energy amount SOC is equal to or larger than the lower limit A, the electric energy storage device 58 is protected from excessive energy consumption with the stored energy amount SOC falling below the lower limit A, which would result in deterioration of the charging and discharging efficiencies of the storage device 58.

As described above, the operation modes 1–4 are selected in the following running states of the vehicle. When the electric energy amount SOC stored in the electric energy storage device 58 is not smaller than the lower limit A, the operation mode 1 is selected in step S13 to drive the vehicle with only the motor/generator 14 as the drive power source if the vehicle is in the low-load running state with the currently required output Pd being equal to or smaller than the first threshold P1. Further, the operation mode 2 is selected in step S17 to drive the vehicle with only the engine 12 as the drive power source if the vehicle is in the medium-load running state with the currently required output Pd being larger than the first threshold P1 and smaller than the second threshold P2, and the operation mode 4 is selected in step S19 to drive the vehicle with both of the engine 12 and the motor/generator 14 as the drive power sources if the vehicle is in the high-load running state with the currently required output Pd being equal to or larger than the second threshold P2.

When the stored electric energy amount SOC is smaller than the lower limit A, the operation mode 3 is selected in step S14 to drive the vehicle with only the engine 12 as the drive power source while at the same time charging the electric energy storage device 58 if the vehicle is in the medium-load running state with the currently required output Pd being smaller than the second threshold P2, and the operation mode 2 is selected in step S17 to drive the vehicle with only the engine 12 without charging the storage device 58 if the vehicle is in the high-load running state with the currently required output Pd being equal to or larger than the second threshold P2.

The operation mode 2 is selected in step S17 in the following two cases: 1) when the vehicle is in the medium-load running state wherein the currently required output Pd is larger than the first threshold P1 and smaller than the second threshold P2, while the stored electric energy amount SOC is not smaller than the lower limit A; and 2) when the vehicle is in the high-load running state wherein the currently required output Pd is equal to or larger than the second threshold P2, while the stored electric energy amount SOC is smaller than the lower limit A. In the medium-load running state of the vehicle, the energy efficiency is generally higher when the vehicle is driven by the engine 12 than when the vehicle is driven by the motor/generator 14. Accordingly, the fuel consumption and exhaust gas emission can be made smaller in the operation mode 2 than in the operation mode 1.

In the high-load running state, it is generally desirable to select the operation mode 4 in which the vehicle is driven by both of the engine 12 and the motor/generator 14. When the electric energy amount SOC stored in the electric energy storage device 58 is smaller than the lower limit A, however, it is desirable to select the operation mode 2, that is, to drive the vehicle with only the engine 12 used as the drive power source, in order to prevent deterioration of the charging and discharging efficiencies of the storage device 58 due to reduction of the stored electric energy amount SOC below the lower limit A.

Figure 9:
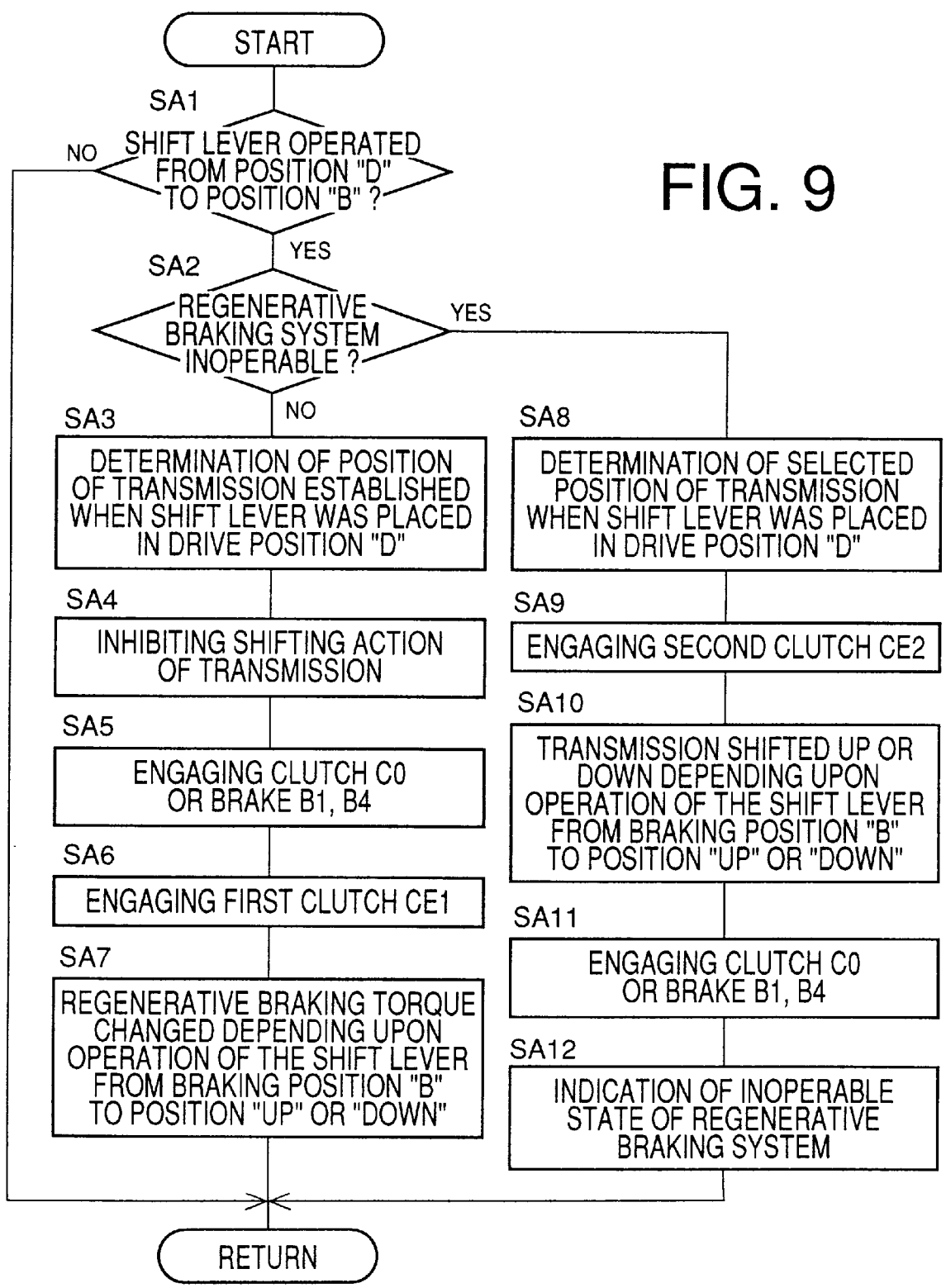
FIG. 9 is a flow chart illustrating a control routine executed according to the first embodiment of the invention.

The hybrid drive controller 50 and the automatic transmission controller 52 are adapted to execute a control routine illustrated in the flow chart of FIG. 9, for controlling the hybrid drive system so as to prevent a sudden change of the regenerative braking force generated by the motor/generator 14 in the regenerative braking mode, and to assure smooth brake application to the vehicle with the shift lever 42 placed in the in the drive-source braking position "B".

It will be understood from the following explanation that a portion of the automatic transmission controller 52 assigned to implement steps SA2 and SA10 of the routine of FIG. 9 constitutes braking shift control means operated when the regenerative braking means is inoperable, for changing the speed ratio of the transmission 18 so as to increase an engine braking force which is generated by a resistance to rotation of the engine and which is applied to the motor vehicle. It will also be understood that a portion of the automatic transmission controller 52 assigned to implement step SA4 constitutes shift inhibiting means for inhibiting a shifting action of the automatic transmission 18 during operation of the regenerative braking means, that is, in the regenerative braking mode, so as to prevent a change of the engine braking force which is applied to the motor vehicle due to a resistance to rotation of the engine. It will be understood that a portion of the hybrid drive controller 50 assigned to implement step SA7 constitutes regenerative braking means for applying to the vehicle the regenerative brake corresponding to the amount of an electric energy generated by the motor/generator 14 when the motor/generator 14 is operated by a kinetic energy of the running vehicle. It will further be understood that a portion of the hybrid drive controller 50 assigned to implement steps SA6 and SA9 constitutes clutch engaging means for engaging the first clutch CE1 during operation of the regenerative braking means.

The routine of FIG. 9 is initiated with step SA1 to determine whether the shift lever 42 has been operated from the drive position "D" to the braking position "B". This determination is effected on the basis of the output signal of the shift position sensor 68.

If an affirmative decision (YES) is obtained in step SA1, the control flow goes to step SA2 to determine whether the regenerative braking system including the motor/generator 14 and the electric energy storage device 58 is inoperable due to some abnormality thereof or excessive charging of the storage device 58. This determination may be effected depending upon a change of the motor speed $N_M$ and the charging efficiency of the storage device 58, or according to a suitably formulated diagnostic sub-routine. It is noted that the regenerative braking system is inoperable when the motor/generator 14 cannot be operated as an electric generator, with the amount of electric energy SOC stored in the storage device 58 being equal to or larger than the predetermined upper limit B indicated above with respect to step S4 of the routine of FIG. 7.

If a negative decision (NO) is obtained in step SA2, namely, if the motor/generator 14 can be operated as the electric generator, the control flow goes to step SA3 to determine the position of the automatic transmission 18 which was established when the shift lever 42 was placed in the drive position "D". This determination may be made on the basis of the ratio of the input shaft speed $N_I$ detected by the input shaft speed sensor 69 to the output shaft speed $N_O$ detected by the vehicle speed sensor 66. Alternatively, the determination in step SA3 may be made on the basis of the operating states of the solenoid-operated valves SL1–SL4.

Step SA3 is followed by step SA4 to inhibit a shifting action of the automatic transmission 18 even if the vehicle running condition represented by the throttle opening angle $\theta_{AC}$ and the vehicle speed V has changed. That is, the automatic transmission 18 is held in the position (e.g., "3rd" determined in step SA3) or in the position (e.g., "2nd") which is one position lower than the position determined in step SA3.

Then, the control flow goes to step SA6 in which the appropriate coasting-brake coupling element C0, B1, B4 (indicated by black circle in FIG. 3) is engaged so that a regenerative brake is applicable to the vehicle without slipping of the one-way clutch F.

Step SA5 is followed by step SA6 in which the first clutch CE1 is engaged (turned ON), so that an engine brake as well as the regenerative brake is applicable to the vehicle. If the first clutch CE1 is already in the engaged state as in the engine braking mode (operation mode 8), the first clutch CE1 is held in the engaged state. Usually, the second clutch CE2 is placed in the engaged state at this time.

Then, the control flow goes to step SA7 in which the regenerative braking torque is decreased if the shift lever 42 is operated by the vehicle operator from the braking position "B" to the position "UP", or increased if the shift lever 42 is operated to the position "DOWN". The amount of decrease or increase of the regenerative braking torque depends upon the time during which the shift lever 42 is held in the position "UP" or "DOWN". However, this amount of decrease or increase may change with the number of operations of the shift lever 42 between the braking position "B" and the position "UP" or "DOWN".

If an affirmative decision (YES) is obtained in step SA2, namely, if the regenerative braking system is inoperable and the motor/generator 14 cannot be operated as the electric generator, the control flow goes to step SA8 identical with step SA3, to determine the position of the automatic transmission 18 which was established when the shift lever 42 was placed in the drive position "D". Step SA8 is followed by step SA9 in which the first clutch CE1 is engaged (turned ON) so that an engine brake is applicable to the vehicle.

Then, the control flow goes to step SA10 in which the automatic transmission 18 is shifted up if the shift lever 42 is operated from the braking position "B" to the position "UP", or shifted down if the shift lever 42 is operated from the braking position "B" to the position "DOWN". The number of shift-up or shift-down positions of the automatic transmission 18 changes with the time during which the shift lever 42 is placed in the position "UP" or "DOWN". Consequently, the engine braking force is changed by the operation of the shift lever 42 from the braking position "B" to the position "UP" or "DOWN". The engine braking force is changed in steps as the automatic transmission 18 is shifted down or up. For smoother change of the engine braking force and reduced shifting shock of the transmission 18, the throttle opening angle $\theta_{AC}$ is desirably changed depending upon the time during which the shift lever 42 is placed in the position "UP" or "DOWN".

Step SA10 is followed by step SA11 identical with step SA5, in which the coating-brake coupling element C0, B1, B4 is engaged. Step SA12 is then implemented to provide a visual indication of the inoperable state of the regenerative braking system, on a suitable display provided on an instrument panel of the vehicle, for example. The visual indication may be replaced by activation of a buzzer or other audio indication. Further, the indication may be provided for each of the motor/generator 14, storage device 58 and other components of the regenerative braking system.

In the present first embodiment, the shift inhibiting means corresponding to step SA4 is provided to inhibit a shifting action of the automatic transmission 18 while the regenerative braking system is operated. Accordingly, the engine braking force generated by a resistance to rotation of the engine 12 is held constant during the regenerative braking by the motor/generator 14, so that the braking force can be smoothly controlled according to the operation of the shift lever 42 to the position "UP" or "DOWN". The present arrangement is also effective to prevent a change in the regenerative braking force due to a shifting action of the automatic transmission 18. Thus, the present embodiment does not suffer from a change in the braking force (drive-source braking force) unexpectedly to the vehicle operator during the regenerative braking.

The present embodiment is also provided with the clutch engaging means corresponding to steps SA6 and SA9, which is adapted to engage the first clutch CE1 for direct connection of the engine 12 and the automatic transmission 18. The clutch engaging means makes it possible to control the engine braking force by shifting up or down the automatic transmission 18 to thereby control the drive-source braking force as desired, even in the case where the motor/generator 14 cannot be operated or used as the electric generator due to some electrical failure of the regenerative braking system or fully charged state of the storage device 58. In addition, the engagement of the first clutch CE1 during the regenerative braking permits fast transition of the operation mode to the engine drive mode (operation mode 2) or engine and motor drive mode (operation mode 4), when the accelerator pedal is depressed again.

The present embodiment is further provided with the braking shift control means corresponding to steps SA2 and SA10, which permits the automatic transmission 18 to be shifted down in response to the operation of the shift lever 42 to the position "DOWN". The shift-down action of the automatic transmission 18 causes an increase in the engine speed $N_E$ and an increase in the engine braking force by a torque boosting effect. This arrangement assures the application of a sufficient drive-source braking force to the vehicle by the engine braking, even where the motor/generator 14 is inoperable due to some electrical abnormality of the regenerative braking system, for example.

Figure 10:
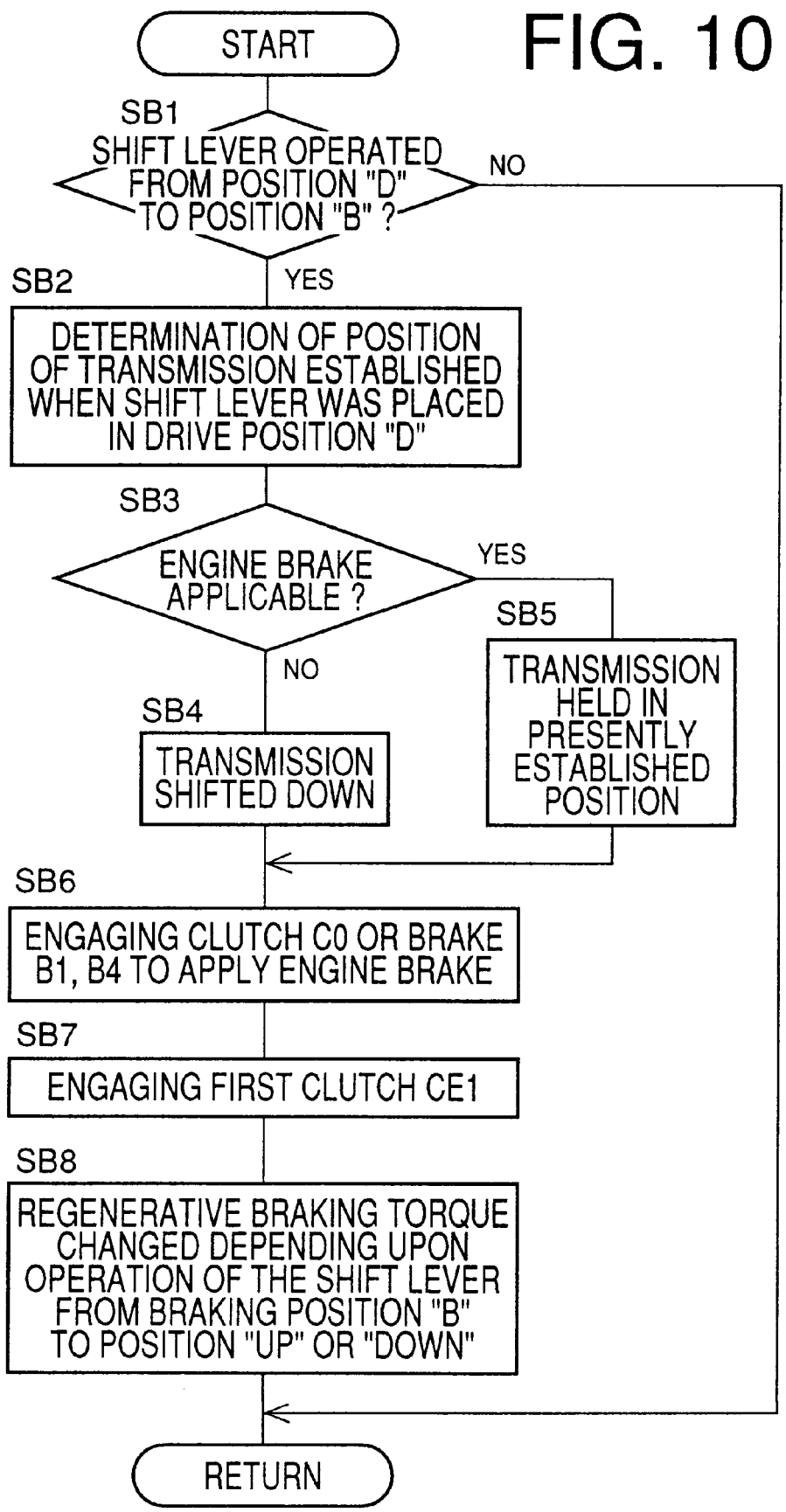
FIG. 10 is a flow chart illustrating a control routine executed according to a second embodiment of the invention.

Reference is now made to the flow chart of FIG. 10 illustrating a control routine executed in a second embodiment of this invention. This control routine is formulated to apply an engine braking force to the vehicle when the regenerative braking force generated by the regenerative braking means is insufficient.

It will be understood that a portion of the hybrid drive controller 50 assigned to implement step SB8 constitutes the regenerative braking means, while a portion of the automatic transmission controller 52 assigned to implement steps SB3–SB5 constitutes braking shift control means operated prior to operation of the regenerative braking means, for controlling the speed ratio of the automatic transmission 18 so that an engine braking force generated by a resistance to rotation of the engine 12 is applied to the motor vehicle.

The control routine of FIG. 10 is initiated with step SB1 to determine whether the shift lever 42 has been operated from the drive position "D" to the drive-source braking position "B". This determination is effected on the basis of the output signal of the shift position sensor 68.

If an affirmative decision (YES) is obtained in step SB1, the control flow goes to step SB2 to detect the position of the automatic transmission 18 which was established when the shift lever 42 was placed in the drive position "D". This determination is effected on the basis of the ratio of the input shaft speed $N_I$ detected by the input shaft speed sensor 69 to the output shaft speed $N_O$ detected by the vehicle speed sensor 66.

Step SB2 is followed by step SB3 to determine whether an engine brake is applicable to the vehicle in the present running condition of the vehicle. This determination is effected on the basis of the vehicle speed V detected by the vehicle speed sensor 66 and the currently established position of the automatic transmission 18, and according to a predetermined data map. If an affirmative decision (YES) is obtained in step SB3, the control flow goes to step SB5 in which the automatic transmission 18 is held in the currently established position. If a negative decision (NO) is obtained in step SB3, the control flow goes to step SB4 in which the automatic transmission 18 is shifted down to one of the forward-drive positions in which the engine brake is applicable to the vehicle.

Steps SB4 and SB5 are followed by step SB6 in which the coasting-brake coupling element C0, B1, B4 (indicated by black circle in FIG. 3) is engaged so that the engine brake is applicable to the vehicle. Then, step SB7 is implemented to engage or turn ON the first clutch CE1 so that the regenerative brake and the engine brake are both applicable to the vehicle.

Then, the control flow goes to step SB8 in which the regenerative braking force is decreased if the shift lever 42 is operated from the drive-source braking position "B" to the position "UP", and is increased if the shift lever 42 is operated from the position "B" to the position "DOWN". The amount of decrease or increase of the regenerative braking force depends upon the time during which the shift lever 42 is held in the position "UP" or "DOWN".

In the present second embodiment of FIG. 10, the braking shift control means corresponding to steps SB3–SB5 is provided to shift down the automatic transmission 18 for applying an engine brake to the vehicle. This arrangement assures the application of a sufficient drive-source braking force to the vehicle by application of an engine brake even when the regenerative braking force generated by the motor/generator 14 is not sufficient.

There will be described a third embodiment of this invention, wherein the hybrid drive controller 50 and the automatic transmission controller 50 are adapted to execute a control routine illustrated in the flow chart of FIG. 11, which is formulated to assure the application of a sufficient drive-source braking force even when the regenerative braking force generated by the motor/generator 14 is not sufficient.

It will be understood that a portion of the hybrid drive controller 50 assigned to implement step SC6 and SC9 constitutes the regenerative braking means, while a portion of the automatic transmission controller 52 assigned to implement steps SC7 and SC8 constitutes braking shift control means operated when the regenerative braking means is inoperable to provide a sufficient regenerative braking force, for changing the speed ratio of the automatic transmission 18 to increase the engine braking force to be applied to the vehicle.

Figure 11:
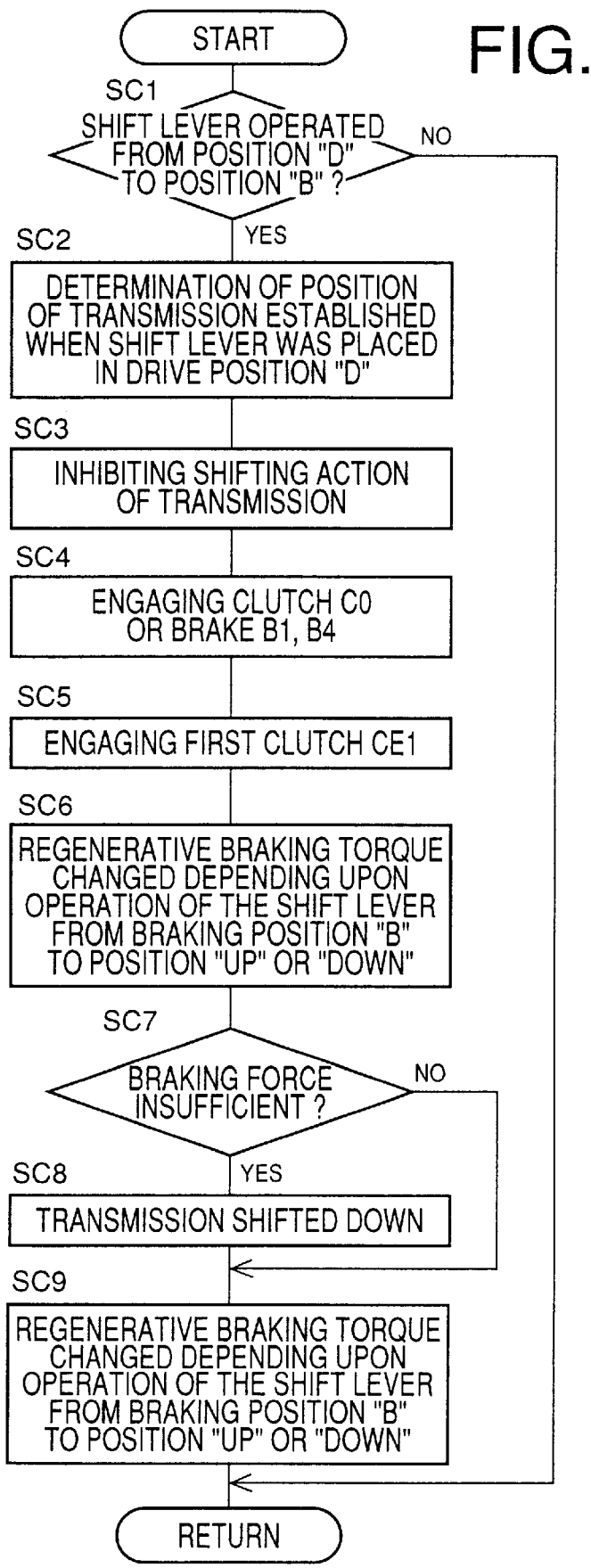
FIG. 11 is a flow chart illustrating a control routine executed according to a third embodiment of this invention.

The control routine of FIG. 11 is initiated with step SC1 to determine whether the shift lever 42 has been operated from the drive position "D" to the drive-source braking position "B". This determination is effected on the basis of the output signal of the shift position sensor 68.

If an affirmative decision (YES) is obtained in step SC1, the control flow goes to step SC2 to detect the position of the automatic transmission 18 which was established when the shift lever 42 was placed in the drive position "D". This determination is effected on the basis of the ratio of the input shaft speed $N_I$ detected by the input shaft speed sensor 69 to the output shaft speed $N_O$ detected by the vehicle speed sensor 66.

Step SC2 is followed by step SC3 to inhibit a shifting action of the automatic transmission 18 even if the vehicle running condition represented by the throttle opening angle $\theta_{AC}$ and the vehicle speed V has changed. That is, the automatic transmission 18 is held in the position (e.g., "3rd" determined in step SC2) or in the position (e.g., "2nd") which is one position lower than the position determined in step SC2.

Then, the control flow goes to step SC4 in which the appropriate coasting-brake coupling element C0, B1, B4 (indicated by black circle in FIG. 3) is engaged so that a regenerative brake is applicable to the vehicle without slipping of the one-way clutch F.

Step SC4 is followed by step SC5 in which the first clutch CE1 is engaged (turned ON) for direct connection of the engine 12 and the automatic transmission 18, so that an engine brake is applicable to the vehicle. Then, the control flow goes to step SC6 in which the regenerative braking torque is decreased if the shift lever 42 is operated by the vehicle operator from the braking position "B" to the position "UP", or increased if the shift lever 42 is operated to the position "DOWN". The amount of decrease or increase of the regenerative braking torque depends upon the time during which the shift lever 42 is held in the position "UP" or "DOWN".

Step SC6 is followed by step SC7 to determine whether the regenerative braking torque increased by the operation of the shift lever 42 to the position "DOWN" is insufficient, more specifically, is smaller than required by the vehicle operator, who has operated the shift lever 42 to the position "DOWN" to increase the regenerative braking torque. This determination is effected by determining whether the regenerative braking torque generated by the motor/generator 14 is held at its maximum value with the shift lever 42 kept in the position "DOWN", for more than a predetermined time.

If an affirmative decision (YES) is obtained in step SC7, it means that the generated regenerated braking torque is insufficient or smaller than required by the vehicle operator. In this case, the control flow goes to step SC8 to shift down the automatic transmission 18, to increase the engine braking force so that the total drive-source braking force (sum of the regenerative and engine braking forces) is increased to the value desired by the vehicle operator.

If a negative decision (NO) is obtained in step SC7, or after step SC8 is implemented, step SC9 is implemented to change the regenerative braking torque depending upon the time during which the shift lever 42 is placed in the position "UP" or "DOWN", as in step SC6.

In the present third embodiment, the braking shift control means corresponding to steps SC7–SC8 is provided to shift down the automatic transmission 18 for increasing the engine braking force, when the generated regenerative braking torque is insufficient or smaller than required by the vehicle operator. This arrangement permits an increase in the total drive-source braking force, with the engine braking force increased by a shift-down action of the automatic transmission 18, even when the maximum regenerative braking force generated by the motor/generator 14 is insufficient. It is noted that the shift-down action of the automatic transmission 18 also results in an increase in the regenerative braking force, contributing to an increase in the total drive-source braking force applied to the vehicle.

Although the present third embodiment is arranged such that the automatic transmission 18 is shifted down if the shift lever 42 is held in the position "DOWN" for more than the predetermined time, the automatic transmission 18 may be shifted up if the shift lever 42 is held in the position "UP" for more than a predetermined time.

Figure 12:
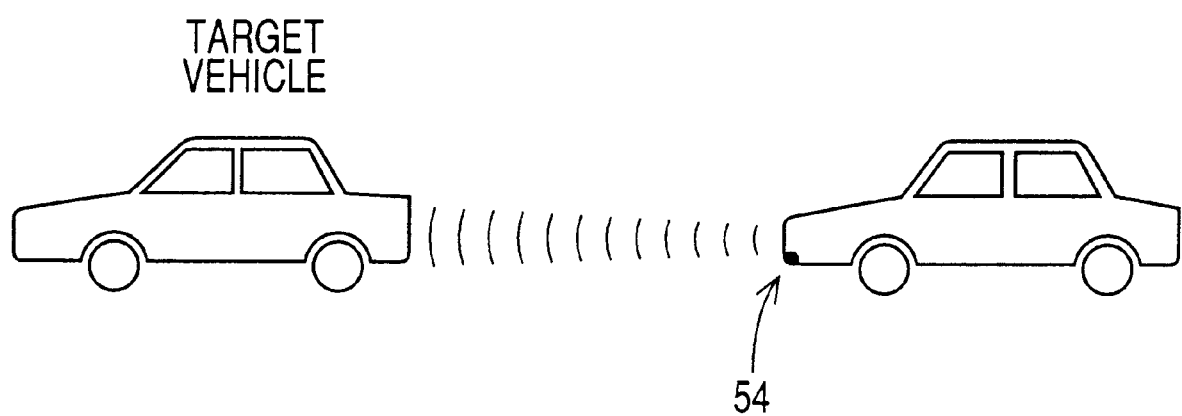
FIG. 12 is a schematic view illustrating a laser cruising of the motor vehicle.
Figure 13:
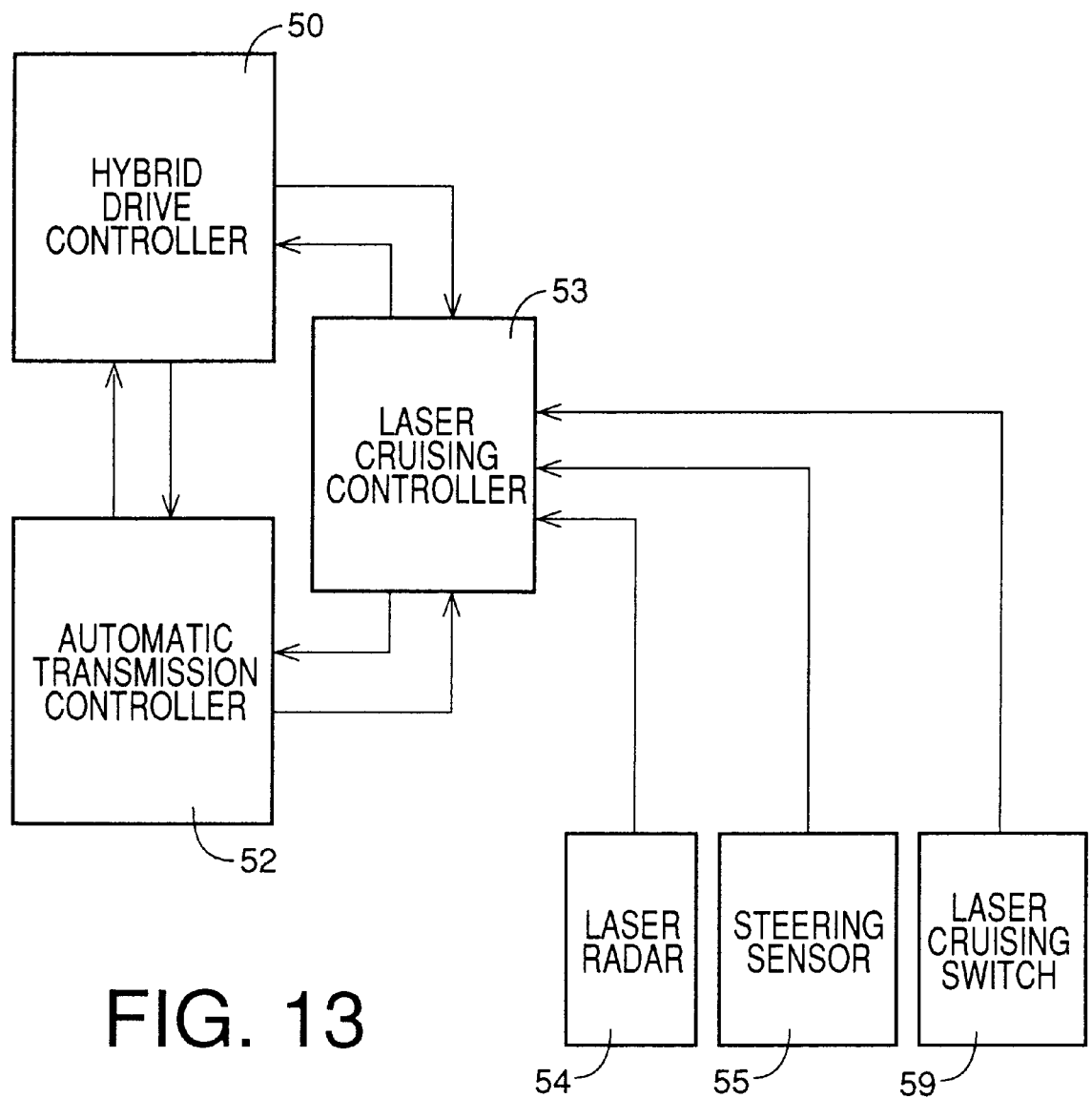
FIG. 13 is a block diagram showing a laser cruising control system for effecting the laser cruising of FIG. 12.
Figure 14:
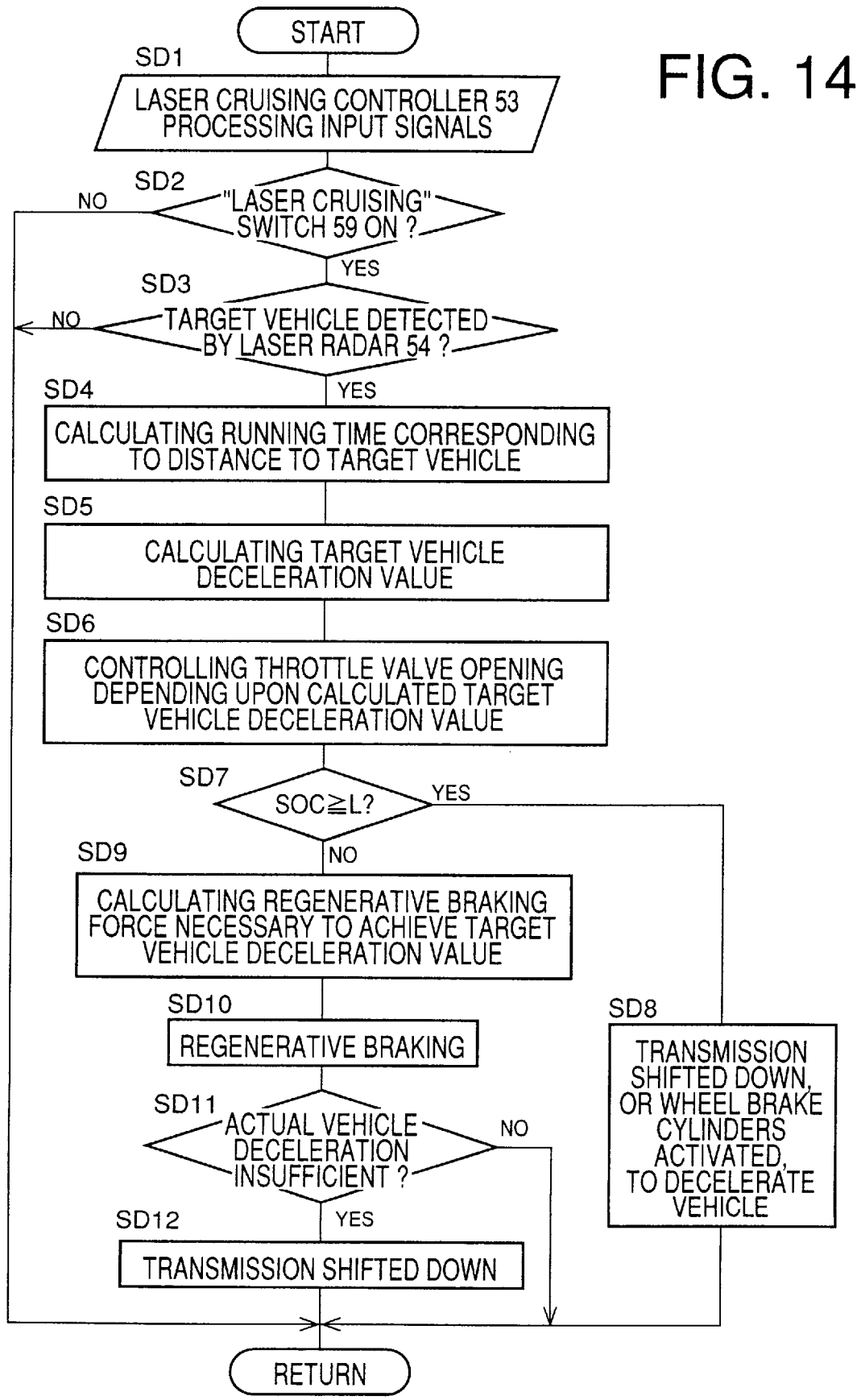
FIG. 14 is a flow chart illustrating a control routine executed according to a fourth embodiment of the invention.

Referring to FIGS. 12–14, a fourth embodiment of the present invention will be described. In this embodiment, the hybrid drive system is adapted effect a so-called "vehicle-to-vehicle distance control" wherein a distance from the vehicle in question to a vehicle (referred to as "target vehicle") running in front of the vehicle in question is detected by a suitable sensor such as a laser radar as shown in FIG. 12, and a laser cruising controller is operated on the basis of the detected vehicle-to-vehicle distance so that the actual distance is held at an optimum value corresponding to the running speed of the vehicle. The vehicle-to-vehicle distance may be detected by using a millimeter wave in place of laser.

The present hybrid drive system uses a laser cruising system which includes a laser cruising controller 53, a laser radar 54, a steering sensor 55 and a LASER CRUISING switch 59, as shown in the block diagram of FIG. 13. The laser cruising controller 53 is connected to the hybrid drive controller 50 and the automatic transmission controller 52, and is adapted to execute a control routine illustrated in the flow chart of FIG. 14. The laser radar 54 is provided to detect the distance to the target vehicle. The steering sensor 55 is adapted to detect a steering angle of the steering wheel of the vehicle in question, while the LASER CRUISING switch 59 is provided to select a LASER CRUISING ON mode and a LASER CRUISING OFF mode. The laser cruising controller 53 receives the output signals of the laser radar 54, steering sensor 55 and LASER CRUISING switch 59, and controls the engine 12, motor/generator 14 and automatic transmission 18, through the controllers 50, 52.

It will be understood that a portion of the laser cruising controller 53 assigned to implement step SD2 constitutes the shift inhibiting means for inhibiting a shifting action of the automatic transmission 18 during operation of the regenerative braking means. It will also be understood that a portion of the controller 53 assigned to implement steps SD7, SD8, SD11 and SD12 constitutes the braking shift control means for changing the speed ratio of the automatic transmission 18 to increase the engine braking force when the regenerative braking means is inoperable, more specifically, when the amount of electric energy SOC stored in the storage device 58 is equal to or larger than a predetermined upper limit. It will also be understood that a portion of the controller 53 assigned to implement step SD10 constitutes the regenerative braking means.

The control routine of FIG. 14 is initiated with step SD1 in which the output signals of the laser radar 54, steering sensor 55 and LASER CRUISING switch 59 are processed by the laser cruising controller 53. Step SD1 is followed by step SD2 to determine whether the LASER CRUISING ON mode is established. This determination is effected on the basis of the output signal of the switch 59. In the LASER CRUISING ON mode, the automatic transmission 18 is inhibited from being shifted according to the ordinary shift patterns, to avoid a change of the engine braking force due to a shifting action of the automatic transmission 18 while a regenerative brake is applied to the vehicle. If an affirmative decision (YES) is obtained in step SD2, the control flow goes to step SD3 to determine whether the target vehicle running in front of the vehicle in question is detected by the laser radar 54.

If an affirmative decision (YES) is obtained in step SD3, the control flow goes to step SD4 to calculate a running time corresponding to the distance to the target vehicle. This running time may be replaced by the distance. Step SD4 is followed by step SD5 to calculate a target deceleration value of the vehicle by comparing the calculated running time and a target running time. If the distance to the target vehicle is obtained in step SD4, the target value of the distance is determined so as to vary with the running speed of the vehicle.

Then, the control flow goes to step SD6 to control the throttle valve of the engine 12 according to the calculated target deceleration value of the vehicle. Namely, the throttle opening angle is reduced if the calculated target deceleration value indicates deceleration of the vehicle, or increased if the target deceleration value indicates acceleration of the vehicle. In step SD6, the first and second clutches CE1, CE2 are both engaged (turned ON), so that an engine brake is applicable to the vehicle.

Step SD6 is followed by step SD7 to determine whether the amount of electric energy SOC stored in the electric energy storage device 58 is equal to or larger than a predetermined threshold L, which is the maximum amount that can be stored in the storage device 58. If an affirmative decision (YES) is obtained in step SD7, it means that the storage device 58 cannot be charged any more. Step SD7 may be formulated to also determine whether the storage device 58 is defective. In any case, the affirmative decision in step SD7 indicates that the motor/generator 14 cannot be operated as an electric generator to apply a regenerative brake to the vehicle. In this case, the control flow goes to step SD8 in which the automatic transmission 18 is shifted down one position to apply an engine brake to the vehicle, or wheel brake cylinders for braking the vehicle wheels are activated, to decelerate the vehicle so as to achieve the calculated target deceleration value. It is noted that the coasting-brake friction element C0, B1, B4 (indicated by black circle in FIG. 3) is in the engaged position even after the shift-down action of the automatic transmission 18.

If a negative decision (NO) is obtained in step SD7, the control flow goes to step SD9 to calculate the amount of regenerative braking force necessary to achieve the target deceleration value, in addition to the engine braking force obtained by fully closing the throttle valve. The required regenerative braking force generated is increased with an increase in the target deceleration value. The required regenerative braking force is calculated by taking into account the currently established position of the automatic transmission 18, the current operating state and slip ratio of the lock-up clutch, and whether the fuel cut of the engine 10 is in effect.

Then, the control flow goes to step SD10 to effect the regenerative braking so as to obtain the amount of regenerative braking force calculated in step SD9. Step SD10 is followed by step SD11 to determine whether the actual vehicle deceleration is insufficient even with the maximum regenerative braking force is generated by the motor/generator 14. If an affirmative decision (YES) is obtained in step SD11, the control flow goes to step SD12 to shift down the automatic transmission 18 one position for further decelerating the vehicle so as to achieve the target deceleration value.

FIG. 15 shows step SD12' implemented in place of step SD12 of the control routine of FIG. 14, in a fifth embodiment of this invention. In step SD12', the wheel brake cylinders are activated to apply a hydraulic brake to the vehicle wheels, to decelerate the vehicle so as to achieve the target deceleration value, without a shift-down action of the automatic transmission 18.

In the fourth and fifth embodiments of FIGS. 14 and 15 of this invention, the automatic transmission 18 is shifted down in step SD12 to apply an engine brake to the vehicle, or the wheel brake cylinders are activated in step SD12' to apply a hydraulic brake to the vehicle wheels, so as to achieve the target deceleration value of the vehicle, if the affirmative decision is obtained in step SD11, that is, if the actual deceleration value of the vehicle is insufficient even with the maximum regenerative braking force of the motor/generator 14. Thus, the sufficient braking force is applied to the vehicle.

Further, the shift-down action of the automatic transmission in step SD12 or the activation of the wheel brake cylinders in step SD12' is effected only after the regenerative brake is applied to the vehicle and only where the maximum regenerative braking force is insufficient. Thus, the regenerative brake is effectively utilized to brake the vehicle, and the fuel economy of the vehicle is accordingly improved.

In the first through fifth embodiments, the shift lever 42 of floor type is used. However, a shift-lever 60 of steering column type as shown in FIG. 16 may be used. Unlike the shift lever 42, this shift lever 60 has the drive-source braking position "B" which is one position lower than the drive position "D". Therefore, the movement of the shift lever 60 from the drive position "D" to the drive-source braking position "B" may be utilized to operate the manual shift valve of the hydraulic control device 44, so that the drive-source braking mode is mechanically established.

Figure 17:
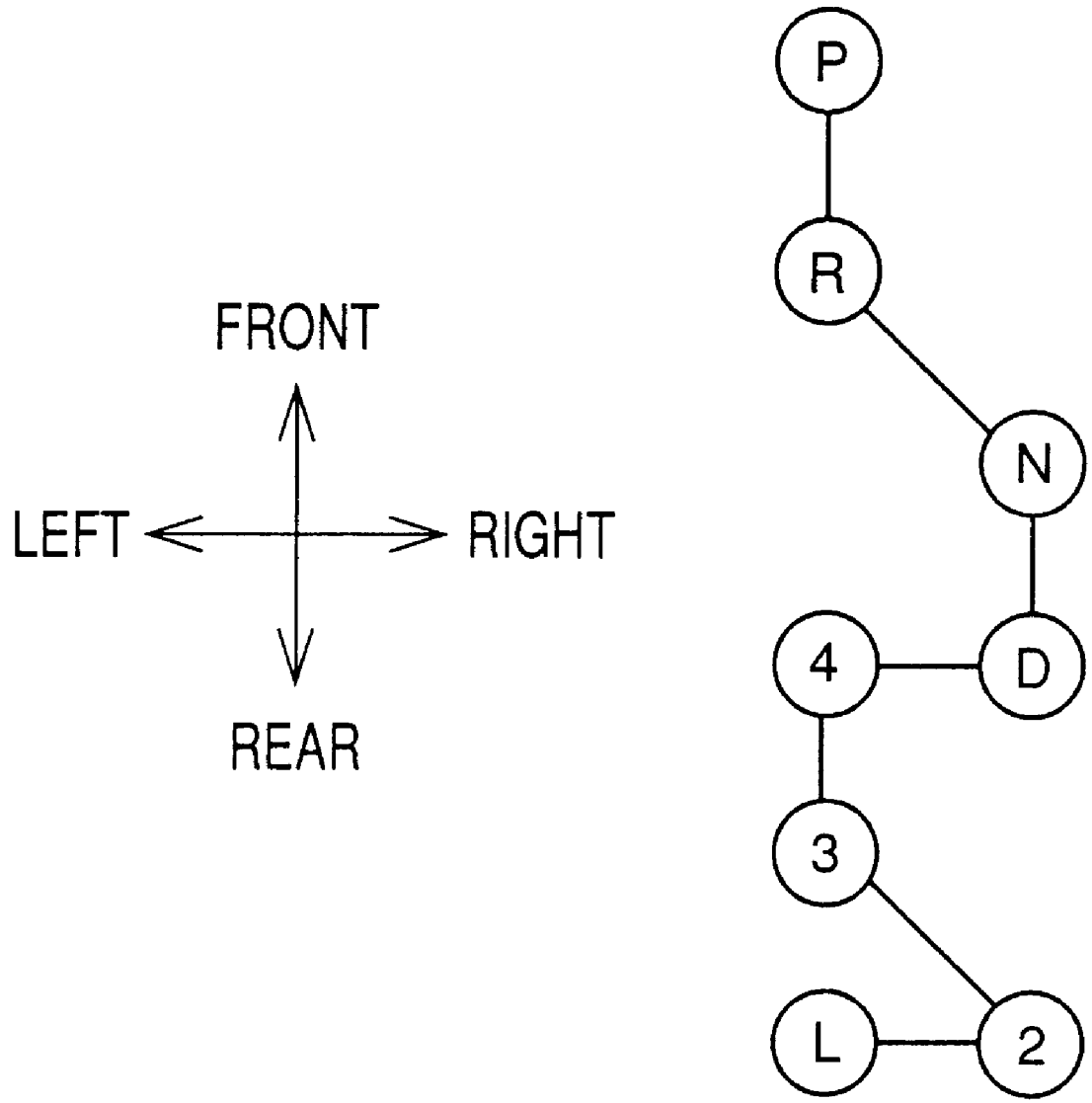
FIG. 17 is a view indicating operating positions of a shift lever used in a sixth embodiment of the present invention.

Referring next to FIGS. 17–22, there will be described a sixth embodiment of this invention. In this embodiment, a shift lever has a total of eight operating positions as shown in FIG. 17, which do not include the drive-source braking position "B" and the positions "UP" and "DOWN" that are provided on the shift lever 42 or 60.

Figure 18:
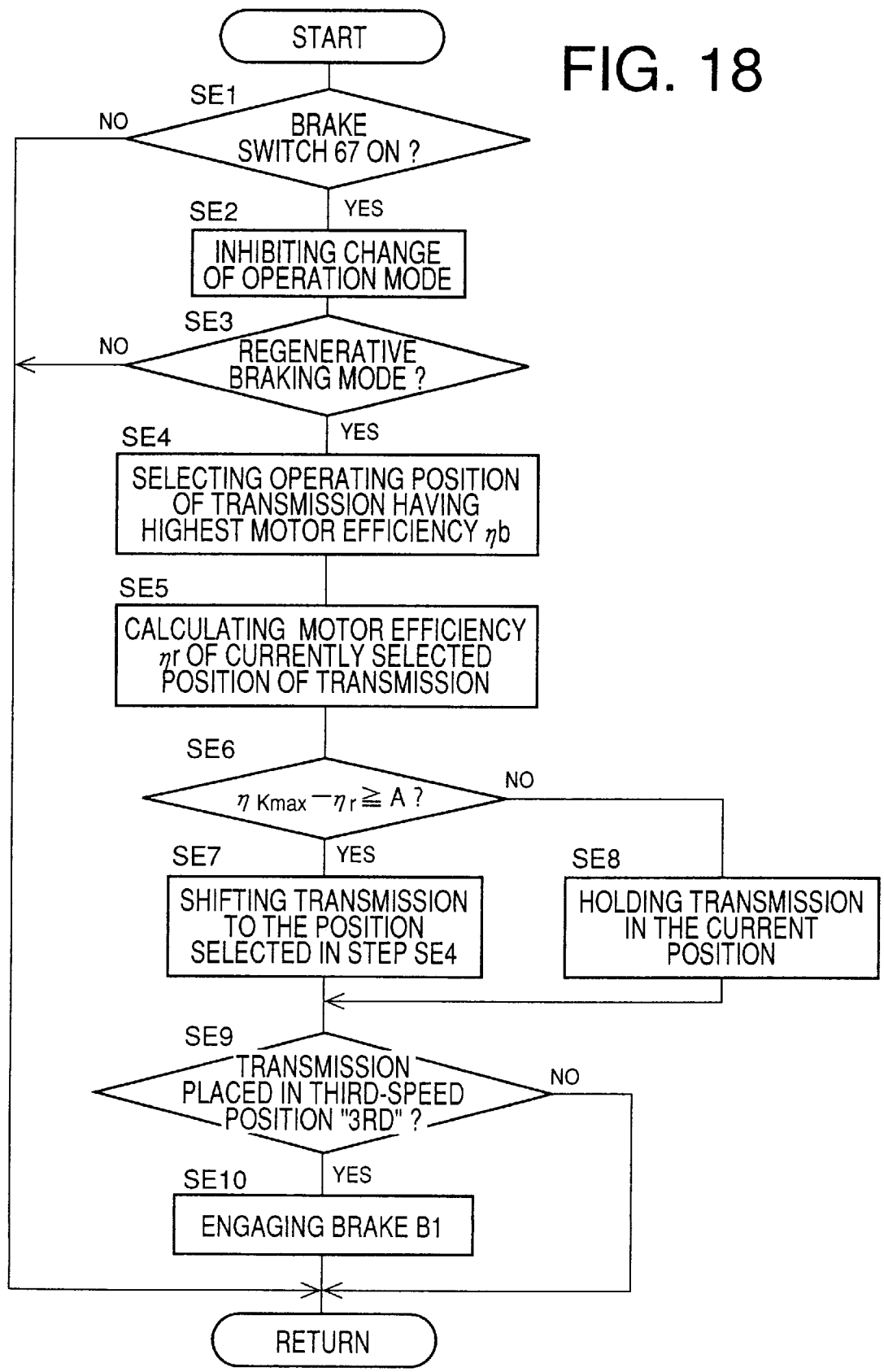
FIG. 18 is a flow chart illustrating a control routine executed in the sixth embodiment of the invention.

In the hybrid drive system according to the present sixth embodiment, the hybrid drive controller 50 and the automatic transmission controller 52 are adapted to execute a control routine illustrated in the flow chart of FIG. 18, which is arranged to inhibit a change of the operation mode from the regenerative braking mode (operation mode 6) to the engine braking mode (operation 8) or vice versa, when the hybrid drive system is placed in the regenerative or engine braking mode.

It will be understood that a portion of the hybrid drive controller 52 assigned to implement step SE2 constitutes mode change inhibiting means for inhibiting a change between the regenerative and engine braking modes during operation of the regenerative or engine braking means. As described above, steps S6 and S5 of the routine of FIG. 7 correspond to the regenerative braking means and the engine braking means, respectively.

The control routine of FIG. 18 is initiated with step SE1 to determine whether the vehicle is being braked. This determination is effected on the basis of the output signal of the brake switch 67. If an affirmative decision (YES) is obtained in step SE1, the control flow goes to step SE2 to inhibit a change of the operation mode of the hybrid drive system according to the operation determining sub-routine of FIG. 7, until the regenerative braking in the regenerative braking mode (operation mode 6) or the engine braking in the engine braking mode (operation mode 8) is completed. In the present embodiment, either the regenerative braking mode or the engine braking mode is established in step S6 or S4, when the affirmative decision (YES) is obtained in step S3, that is, when the affirmative decision is obtained in step SE1 of FIG. 18. Steps S3 and SE1 may be modified to determine whether the brake pedal is depressed and/or the accelerator pedal is released.

In step SE2, therefore, the switching of the operation mode from the regenerative braking mode to the engine braking mode or vice versa is inhibited once one of these modes is established, and until the regenerative or engine braking is completed.

Step SE2 is followed by step SE3 to determine whether the regenerative braking mode (operation mode 6) is currently established. This determination is effected on the basis of the decision obtained in step S3 of the sub-routine of FIG. 7. If an affirmative decision (YES) is obtained in step SE3, the control flow goes to step SE4.

Figure 19:
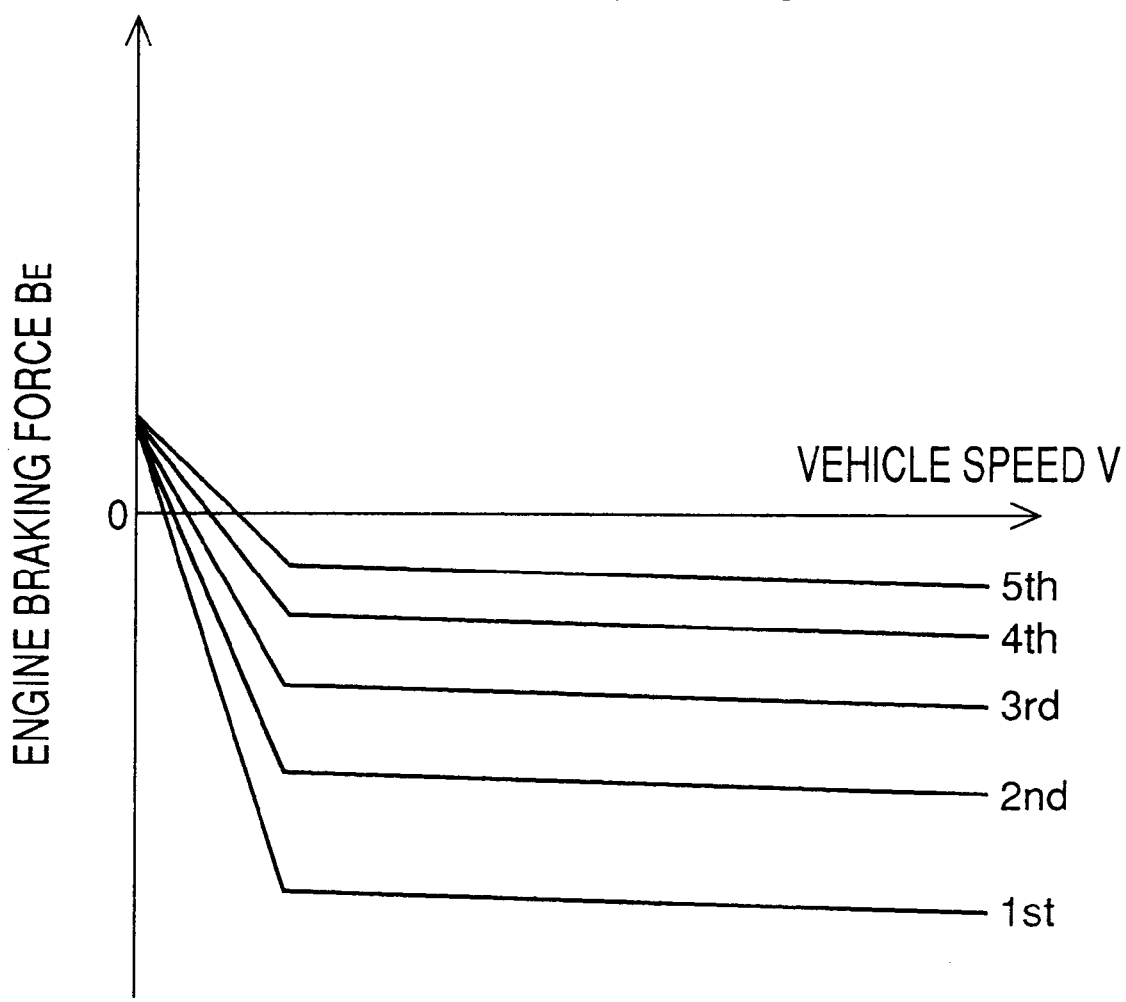
FIG. 19 is a view indicating a relationship among vehicle running speed V, selected operating position of the automatic transmission and engine braking force $B_E$, which relationship is used in the control routine of FIG. 18.
Figure 20:
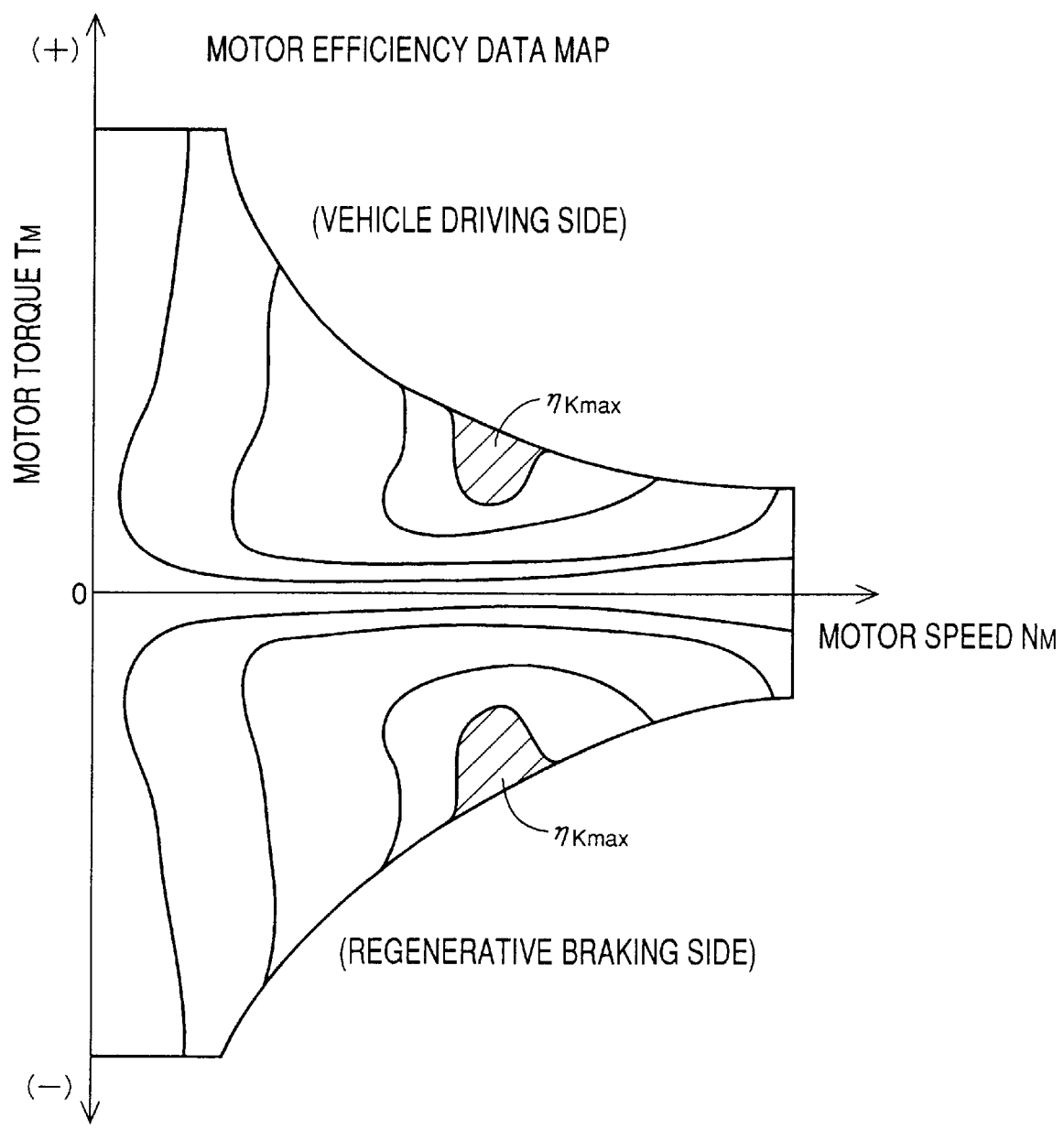
FIG. 20 is a view indicating a relationship among motor speed $N_E$, motor torque $T_M$ and motor efficiency $\eta_k$, which relationship is used in the control routine of FIG. 18.

Step SE4 is provided to select one of the operating positions of the automatic transmission 18 which has the highest efficiency $\eta_{kmax}$ of the motor/generator 14. The selected position is determined as the position to which the automatic transmission 18 should be shifted. To select the position having the highest efficiency $\eta b$, the positions of the automatic transmission 18 that are selectable according to the predetermined shift patterns are determined on the basis of the currently selected position of the shift lever represented by the output signal of the shift position sensor 68. Then, the motor speed $N_M$ is calculated for each of these determined positions of the automatic transmission 18, on the basis of the vehicle speed V and the speed ratio of those positions. Further, the engine braking force $B_E$ when the engine 12 is used as the source of the drive-source braking is calculated for each of the determined positions, on the basis of the vehicle speed V and according to a predetermined relationship as indicated in FIG. 19 by way of example. Then, the motor torque $T_M$ (regenerative braking torque) which is substantially equal to the calculated engine braking force $B_E$ calculated is calculated for each position, according to a predetermined equation or data map. Finally, the motor efficiency $\eta_k$ of each of the determined positions of the automatic transmission 18 is calculated on the basis of the calculated motor speed $N_M$ and motor torque $T_M$, and according to a predetermined relationship as indicated in FIG. 20 by way of example. The position of the automatic transmission 18 which has the highest motor efficiency $\eta_{kmax}$ is selected as the position to which the transmission 18 should be shifted.

Step SE4 is followed by step SE5 in which the motor efficiency $\eta_r$ of the currently established position of the automatic transmission 18, according to the relationship of FIG. 20, as in step SE4. It is noted that the actual motor torque $T_M$ is controlled so as to provide the regenerative braking force substantially equal to the engine braking force $B_E$, depending upon the vehicle speed V and the currently established position of the automatic transmission 18. Then, the control flow goes to step SE6 to determine whether a difference $(\eta_{kmax}-\eta_r)$ of the present motor efficiency $\eta_r$ from the highest motor efficiency $\eta_b$ is equal to or larger than a predetermined threshold A. This threshold is a comparatively small value, so that a negative decision (NO) is obtained in step SE6 when the difference $(\eta_{kmax}-\eta_r)$ is relatively small.

If an affirmative decision (YES) is obtained in step SE6, that is, if the difference $(\eta_{kmax}-\eta_r)$ is relatively large, the control flow goes to step SE7 in which the automatic transmission 18 is shifted to the position selected in step SE4. If the negative decision (NO) is obtained in step SE6, the control flow goes to step SE8 in which the automatic transmission 18 remains in the currently established position, in order to prevent a shifting shock or frequent shifting of the automatic transmission 18, rather than to improve the motor efficiency $\eta_k$.

Steps SE7 and SE8 are followed by step SE9 to determine whether the automatic transmission 18 is currently placed in the third-speed position "3rd". This determination is effected by determining whether the ratio of the input shaft speed $N_I$ to the output shaft speed $N_O$ is substantially equal to the speed ratio of the third-speed position "3rd". If an affirmative decision (YES) is obtained In step SE9, the control flow goes to step SE10 to suitably energize or deenergize the solenoid-operated valves SL1–SL4 for engaging the brake B1 (coasting-brake coupling element), so that the engine brake and the regenerative brake are applicable to the vehicle in the third-speed position "3rd". In the present embodiment, the coasting-brake coupling element (brake B1) is engaged only where the automatic transmission 18 is placed in the third-speed position "3rd". However, it is desirable to engage the coasting-brake coupling clutch C0 when the transmission 18 is placed in the second-speed position "2nd", or the coasting-brake coupling brake B4 when the transmission 18 is placed in the first-speed position "1st".

In the present sixth embodiment, the mode change inhibiting means corresponding to step SE2 is provided to inhibit a change of the operation mode of the hybrid drive system from the regenerative braking mode (operation mode 6) to the engine braking mode (operation mode 8) or vice versa, as long as the regenerative braking mode or the engine braking mode is established, or until the regenerative or engine braking is completed. Therefore, the present arrangement prevents a change of the source of the drive-source braking (between the engine 12 and the motor/generator 14) and a change in the operating state of the first clutch CE1, whereby a change of the drive-source braking force unexpected to the vehicle operator is avoided.

The present embodiment is further adapted to control the motor/generator 14 so as to provide the motor torque $T_M$ or regenerative braking force which is substantially equal to the engine braking force $B_E$ which is calculated for each position of the automatic transmission 18 to which it is shifted next. This arrangement prevents a difference of the regenerative braking force in the regenerative braking mode from the engine braking force in the engine braking mode.

Figure 21:
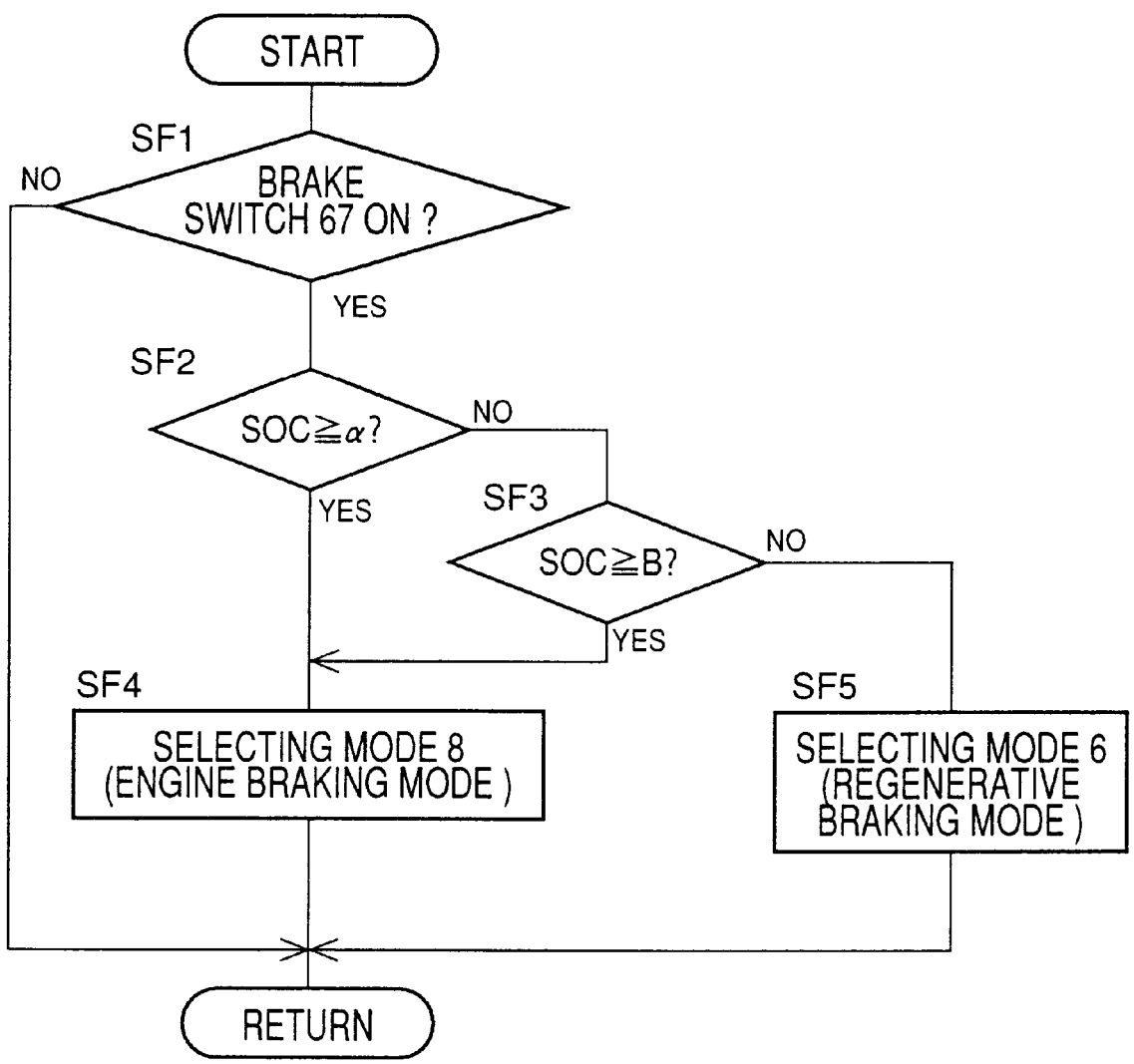
FIG. 21 is a flow chart illustrating a control routine for selectively establishing a regenerative braking mode or an engine braking mode in a seventh embodiment of the invention.

Referring to the flow chart of FIG. 21, there is illustrated a control routine for selectively establishing the operation mode 6 (regenerative braking mode) and the operation mode 8 (engine braking mode), which is executed in a seventh embodiment of the invention, in place of steps S3–S6 of the operation mode determining sub-routine illustrated in the flow chart of FIG. 7.

The routine of FIG. 21 is initiated with step SF1 similar to step S3, to determine whether brake application to the vehicle is required. This determination is effected on the basis of the output signal of the brake switch 67. If an affirmative decision (YES) is obtained in step SF1, the control flow goes to step SF2 to determine whether the amount of electric energy amount SOC stored in the storage device 58 is equal to or larger than a predetermined threshold α, which corresponds to the 100% capacity of the storage device 58. Namely, the storage device 58 cannot be charged and the regenerative braking mode (operation mode 6) cannot be established, if an affirmative decision (YES) is obtained in step SF2.

When the affirmative decision is obtained in step SF2, the control flow goes to step SF4 to select the operation mode 8 (engine braking mode) in which the engine brake is applied to the vehicle. If a negative decision (NO) is obtained in step SF2, the control flow goes to step SF3 to determine whether the stored electric energy amount SOC is equal to or larger than the predetermined upper limit B. As described above with respect to step S4 of FIG. 7, the upper limit B is an upper limit of the stored electric energy amount SOC below which the electric energy storage device 58 is permitted to be charged.

If an affirmative decision (YES) is obtained in step SF3, the control flow goes to step SF4 to select the operation mode 8. If a negative decision (NO) is obtained in step SF3, the control flow goes to step SF5 to select the operation mode 6 (engine braking mode).

Figure 22:
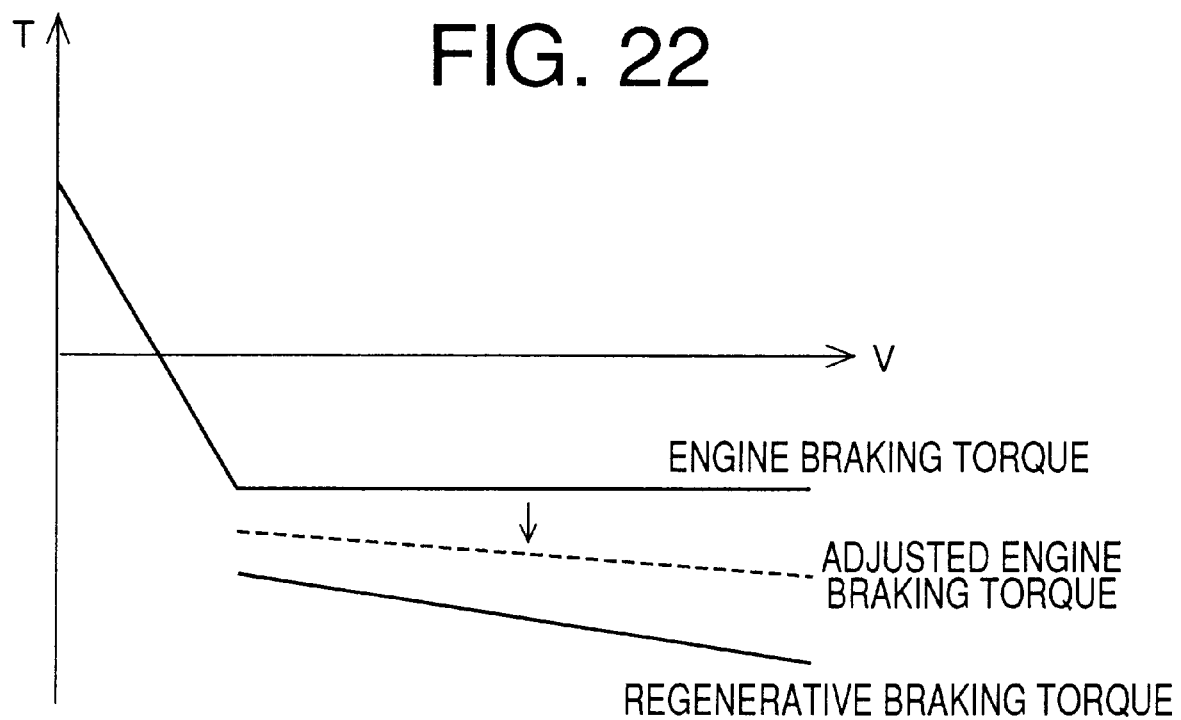
FIG. 22 is a view for explaining adjustment of engine braking force so as to be closer to regenerative braking force, in the embodiment of FIG. 21.

The regenerative braking torque T (motor torque $T_M$) generated in the regenerative braking mode may be changed linearly as a function the vehicle speed V, as indicated in FIG. 22, in order to improve the regeneration efficiency. In this case, it is desirable to control the amount of slip of the lock-up clutch (disposed between the engine 12 and the vehicle drive wheels) or the throttle opening angle $\theta_{AC}$ in the engine braking mode so that the engine braking torque is linearly changed at a rate close to that of the regenerative braking torque, with the speed ratio of each position of the automatic transmission 18 being taken into account.

It will be understood that the routine of FIG. 21 to selectively establish the operation modes 6 and 8 is arranged such that once the operation mode 6 or 8 is selected and established, this mode is continuously established until the condition for initiating the drive-source braking becomes absent, for example, until the brake switch 67 is turned OFF.

Figure 23:
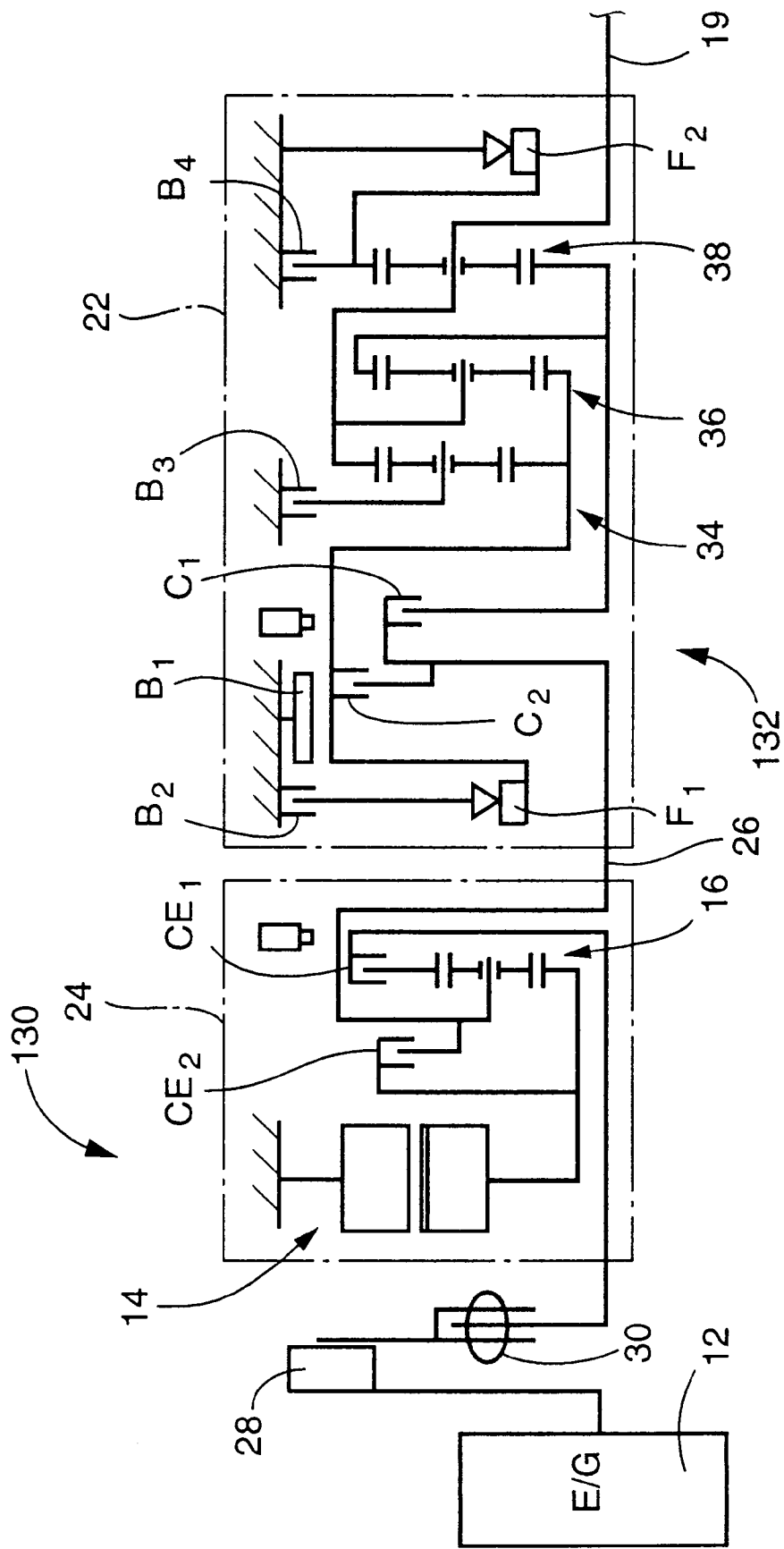
FIG. 23 is a schematic view showing a hybrid drive system according to a further embodiment of the invention.

Although the first through seventh embodiments of the invention have been described above as applied to the hybrid drive system 10 of FIG. 1 including the automatic transmission 18, the principle of this invention is equally applicable to a hybrid drive system 130 as shown in FIG. 23, which is constructed according to a seventh embodiment of the invention. This hybrid drive system 130 of FIG. 23 uses an automatic transmission 132 which does not include the auxiliary transmission 20 and employs only the primary transmission 22. While the automatic transmission 18 of the hybrid drive system of FIG. 1 has one rear-drive position and five-forward drive positions, the automatic transmission 132 used according to the present seventh embodiment has one rear-drive position and four forward-drive positions, as indicated in FIG. 24.

While the present invention has been described above in its presently preferred embodiments by reference to the accompanying drawings, it is to be understood that the invention may be otherwise embodied.

It is to be understood that the present invention may be embodied with various other changes, modifications and improvements, which may occur to those skilled in the art, in the light of the foregoing teaching.

What is claimed is:

1. A hybrid drive system for a motor vehicle, comprising:
a drive power source including an engine operated by combustion of a fuel, and a motor/generator operated with an electric energy;
an automatic transmission which is disposed between at least said engine of said drive power source and a drive wheel of the motor vehicle and which is shifted to change a speed ratio thereof in steps according to predetermined shift patterns;
regenerative braking means for applying to the motor vehicle a regenerative braking force corresponding to an amount of electric energy generated by said motor/generator during an operation of said motor/generator by a kinetic energy of the motor vehicle; and
shift inhibiting means for inhibiting a shifting action of said automatic transmission during an operation of said regenerative braking means, so as to prevent a change of an engine braking force which is applied to the motor vehicle due to a resistance to rotation of said engine.

2. A hybrid drive system according to claim 1, further comprising:
manually operated member for establishing a drive-source braking mode in which said regenerative braking force and said engine braking force are applicable to the motor vehicle; and
regenerative brake adjusting means for changing said regenerative braking force generated by said regenerative braking means in said drive-source braking mode.

3. A hybrid drive system according to claim 2, wherein said manually operated member includes a shift lever having a plurality of operating positions including a drive position in which said automatic transmission is selectively placed in one of a plurality of forward-drive positions according to said predetermined shift patterns, and a drive-source driving position, said drive-source braking mode is established when said shift lever is operated from said drive position to said drive-source drive position.

4. A hybrid drive system according to claim 3, wherein said regenerative brake adjusting means includes said shift lever which further includes a position to which said shift lever is operable from said drive-source braking position for changing said regenerative braking force generated by said regenerative braking means.

5. A hybrid drive system for a motor vehicle, comprising:
a drive power source including an engine operated by combustion of a fuel, and a motor/generator operated with an electric energy;
an automatic transmission which is disposed between at least said engine of said drive power source and a drive wheel of the motor vehicle and whose speed ratio is variable;
regenerative braking means for applying to the motor vehicle a regenerative braking force corresponding to an amount of electric energy generated by said motor/generator during an operation of said motor/generator by a kinetic energy of the motor vehicle; and
braking shift control means operated when said regenerative braking means is inoperable to provide a required amount of said regenerative braking force, for changing the speed ratio of said automatic transmission to increase an engine braking force which is generated by a resistance to rotation of said engine and which is applied to the motor vehicle.

6. A hybrid drive system according to claim 5, wherein said braking shift control means is operated when said regenerative braking means is inoperable due to an abnormality thereof.

7. A hybrid drive system according to claim 5, wherein said braking shift control means is operated when the regenerative braking force generated by said motor/generator is smaller than required by an operator of the motor vehicle.

8. A hybrid drive system according to claim 5, wherein said motor/generator is operated by an electric energy stored in an electric energy storage device, to drive the motor vehicle, said braking shift control means being operated when an amount of said electric energy stored in said electric energy storage device is larger than a predetermined upper limit.

9. A hybrid drive system according to claim 5, further comprising shift inhibiting means for inhibiting a shifting action of said automatic transmission during an operation of said regenerative braking means, so as to prevent a change of an engine braking force which is applied to the motor vehicle due to a resistance to rotation of said engine.

10. A hybrid drive system according to claim 5, further comprising:
   manually operated member for establishing a drive-source braking mode in which said regenerative braking force and said engine braking force are applicable to the motor vehicle; and
   regenerative brake adjusting means for changing said regenerative braking force generated by said regenerative braking means in said drive-source braking mode.

11. A hybrid drive system according to claim 10, wherein said manually operated member includes a shift lever having a plurality of operating positions including a drive position in which said automatic transmission is selectively placed in one of a plurality of forward-drive positions according to said predetermined shift patterns, and a drive-source driving position, said drive-source braking mode is established when said shift lever is operated from said drive position to said drive-source drive position.

12. A hybrid drive system according to claim 11, wherein said regenerative brake adjusting means includes said shift lever which further includes a position to which said shift lever is operable from said drive-source braking position for changing said regenerative braking force generated by said regenerative braking means.

13. A hybrid drive system of a motor vehicle, comprising:
   a drive power source including an engine operated by combustion of a fuel, and a motor/generator operated with an electric energy;
   an automatic transmission which is disposed between at least said engine of said drive power source and a drive wheel of the motor vehicle and whose speed ratio is variable;
   regenerative braking means for applying to the motor vehicle a regenerative braking force corresponding to an amount of electric energy generated by said motor/generator during an operation of said motor/generator by a kinetic energy of the motor vehicle; and
   braking shift control means operated prior to an operation of said regenerative braking means, for controlling the speed ratio of said automatic transmission, so that an engine braking force generated by a resistance to rotation of said engine is applied to the motor vehicle.

14. A hybrid drive system according to claim 13, further comprising:
   manually operated member for establishing a drive-source braking mode in which said regenerative braking force and said engine braking force are applicable to the motor vehicle; and
   regenerative brake adjusting means for changing said regenerative braking force generated by said regenerative braking means in said drive-source braking mode.

15. A hybrid drive system according to claim 14, wherein said manually operated member includes a shift lever having a plurality of operating positions including a drive position in which said automatic transmission is selectively placed in one of a plurality of forward-drive positions according to said predetermined shift patterns, and a drive-source driving position, said drive-source braking mode is established when said shift lever is operated from said drive position to said drive-source drive position.

16. A hybrid drive system according to claim 15, wherein said regenerative brake adjusting means includes said shift lever which further includes a position to which said shift lever is operable from said drive-source braking position for changing said regenerative braking force generated by said regenerative braking means.

17. A hybrid drive system of a motor vehicle, comprising:
   a drive power source including an engine operated by combustion of a fuel, and a motor/generator operated with an electric energy;
   an automatic transmission which is disposed between at least said engine of said drive power source and a drive wheel of the motor vehicle and whose speed ratio is variable;
   clutch means disposed between said automatic transmission and said engine, for selectively connecting and disconnecting said automatic transmission and said engine to and from each other;
   regenerative braking means for applying to the motor vehicle a regenerative braking force corresponding to an amount of electric energy generated by said motor/generator during an operation of said motor/generator by a kinetic energy of the motor vehicle; and
   clutch engaging means for engaging said clutch means to connect said automatic transmission and said engine to each other during an operation of said regenerative braking means.

18. A hybrid drive system according to claim 17, wherein said automatic transmission is shifted to change the speed ratio thereof in steps according to predetermined shift patterns, said hybrid drive system further comprising shift inhibiting means for inhibiting a shifting action of said automatic transmission during the operation of said regenerative braking means, so as to prevent a change of an engine braking force which is applied to the motor vehicle due to a resistance to rotation of said engine.

19. A hybrid drive system according to claim 17, further comprising braking shift control means operated when said regenerative braking means is inoperable to provide a required amount of said regenerative braking force, for changing the speed ratio of said automatic transmission to increase an engine braking force which is generated by a resistance to rotation of said engine and which is applied to the motor vehicle.

20. A hybrid drive system according to claim 17, further comprising:
   manually operated member for establishing a drive-source braking mode in which said regenerative braking force and said engine braking force are applicable to the motor vehicle; and
   regenerative brake adjusting means for changing said regenerative braking force generated by said regenerative braking means in said drive-source braking mode.

21. A hybrid drive system according to claim 20, wherein said manually operated member includes a shift lever having a plurality of operating positions including a drive position in which said automatic transmission is selectively placed in one of a plurality of forward-drive positions according to said predetermined shift patterns, and a drive-source driving position, said drive-source braking mode is established when said shift lever is operated from said drive position to said drive-source drive position.

22. A hybrid drive system according to claim 21, wherein said regenerative brake adjusting means includes said shift lever which further includes a position to which said shift lever is operable from said drive-source braking position for changing said regenerative braking force generated by said regenerative braking means.

23. A hybrid drive system for a motor vehicle, comprising:
- a drive power source including an engine operated by combustion of a fuel, and a motor/generator;
- regenerative braking means operated in a regenerative braking mode, for applying to the motor vehicle a regenerative braking force corresponding to an amount of electric energy generated by said motor/generator during an operation of said motor/generator by a kinetic energy of the motor vehicle;
- engine braking means operated in an engine braking mode, for applying to the motor vehicle an engine braking force corresponding to a resistance to rotation of said engine when said engine is operated by the kinetic energy of the motor vehicle;
- said regenerative braking mode and said engine braking mode being selectively established under respective running conditions of the motor vehicle; and
- mode change inhibiting means for inhibiting a change between said regenerative braking mode and said engine braking mode while one of said regenerative braking means and said engine braking means is operated.

24. A hybrid drive system according to claim 23, further comprising an automatic transmission which is disposed between said drive power source and a drive wheel of the motor vehicle and whose speed ratio is variable, and wherein said engine braking means comprises means operated in said engine braking mode, for changing the speed ratio of said automatic transmission to apply said engine braking force to the motor vehicle, said regenerative braking means comprising means operated in said regenerative braking mode, for controlling the electric energy generated by said motor/generator so that said regenerative braking force is substantially equal to the engine braking force generated by changing said speed ratio.

* * * * *